US012542626B2

(12) United States Patent
Zhang et al.

(10) Patent No.: US 12,542,626 B2
(45) Date of Patent: Feb. 3, 2026

(54) METHODS PROVIDING SIDELINK HARQ AT ACCESS STRATUM AND RELATED WIRELESS DEVICES

(71) Applicant: Telefonaktiebolaget LM Ericsson (publ), Stockholm (SE)

(72) Inventors: Congchi Zhang, Shanghai (CN); Marco Belleschi, Solna (SE); Zhang Zhang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 689 days.

(21) Appl. No.: 17/602,262

(22) PCT Filed: Mar. 19, 2020

(86) PCT No.: PCT/EP2020/057551
§ 371 (c)(1),
(2) Date: Oct. 7, 2021

(87) PCT Pub. No.: WO2020/207737
PCT Pub. Date: Oct. 15, 2020

(65) Prior Publication Data
US 2022/0166558 A1    May 26, 2022

(30) Foreign Application Priority Data
Apr. 8, 2019  (WO) ................ PCT/CN2019/081706

(51) Int. Cl.
*H04L 1/1812* (2023.01)
*H04L 1/1867* (2023.01)
(52) U.S. Cl.
CPC .......... *H04L 1/1812* (2013.01); *H04L 1/1896* (2013.01)

(58) Field of Classification Search
None
See application file for complete search history.

(56) References Cited

U.S. PATENT DOCUMENTS

2018/0160445 A1\* 6/2018 Babaei ................ H04W 72/044
2018/0199229 A1\* 7/2018 Lee ....................... H04W 72/569
(Continued)

FOREIGN PATENT DOCUMENTS

CN    108923894 A    11/2018
EP    3412090 A1    12/2018
(Continued)

OTHER PUBLICATIONS

International Search Report and Written Opinion of the International Searching Authority for PCT International Application No. PCT/EP2020/057551 dated Aug. 13, 2020.

*Primary Examiner* — Jeffrey M Rutkowski
*Assistant Examiner* — Ning Li
(74) *Attorney, Agent, or Firm* — Sage Patent Group

(57) ABSTRACT

A method of operating a wireless device providing SL communications may be provided. A plurality of SDUs may be generated, wherein each of the SDUs is associated with a respective service, wherein a first SDU of the plurality of SDUs is associated with a first service and a first SL HARQ configuration, and wherein a second SDU of the plurality of SDUs is associated with a second service and a second SL HARQ configuration. The plurality of SDUs may be multiplexed into a TB so that the TB includes the first and second SDUs. A SL HARQ configuration may be selected for the TB based on at least one of the first SL HARQ configuration and the second SL HARQ configuration. The TB may be transmitted over a sidelink to at least one other wireless device using the SL HARQ configuration selected for the TB.

18 Claims, 16 Drawing Sheets

(56) References Cited

U.S. PATENT DOCUMENTS

| | | | | |
|---|---|---|---|---|
| 2018/0249513 A1* | 8/2018 | Chang | | H04W 76/10 |
| 2019/0150176 A1* | 5/2019 | Pelletier | | H04W 28/0278 |
| | | | | 370/329 |
| 2020/0137768 A1* | 4/2020 | Jose | | H04W 72/21 |
| 2020/0169986 A1* | 5/2020 | Lee | | H04W 72/52 |
| 2020/0322095 A1* | 10/2020 | Park | | H04W 4/40 |
| 2021/0168647 A1* | 6/2021 | Li | | H04W 28/0263 |
| 2022/0078768 A1* | 3/2022 | El Hamss | | H04W 72/21 |
| 2022/0086607 A1* | 3/2022 | Ali | | H04W 4/06 |
| 2022/0124466 A1* | 4/2022 | Ali | | H04W 4/40 |
| 2022/0132603 A1* | 4/2022 | Adjakple | | H04W 8/005 |
| 2022/0140861 A1* | 5/2022 | Liu | | H04W 28/082 |
| | | | | 370/228 |
| 2022/0159628 A1* | 5/2022 | Bangolae | | H04W 72/04 |
| 2022/0399962 A1* | 12/2022 | Lee | | H04W 72/543 |
| 2023/0163924 A1* | 5/2023 | Lee | | H04W 52/325 |

FOREIGN PATENT DOCUMENTS

| | | | | |
|---|---|---|---|---|
| WO | 2017063697 A1 | 4/2017 | | |
| WO | WO/2020/061768 | * 9/2018 | | H04L 69/324 |
| WO | 2019029652 A1 | 2/2019 | | |
| WO | WO 2020/191625 A1 * | 3/2019 | | H04L 1/00 |

\* cited by examiner

METHODS PROVIDING SIDELINK HARQ AT ACCESS STRATUM AND RELATED WIRELESS DEVICES

CROSS REFERENCE TO RELATED APPLICATIONS

This application is a 35 U.S.C. § 371 national stage application of PCT International Application No. PCT/EP2020/057551 filed on Mar. 19, 2020, which itself is a continuation of PCT International Application No. PCT/CN2019/081706, filed Apr. 8, 2019, the disclosures and contents of which are incorporated by reference herein in their entireties.

TECHNICAL FIELD

The present disclosure relates generally to communications, and more particularly to communication methods and related devices and nodes supporting wireless communications.

BACKGROUND

Cellular Intelligent Transport Systems ITS aims at defining a new cellular eco-system for the delivery of vehicular services and their dissemination. Such eco-system include both short range and long range V2X service transmissions, as depicted in the C-ITS environment of FIG. 1. In particular, short range communication involves transmissions over the D2D link, also defined as sidelink or PC5 interface in 3GPP, towards other vehicular UEs or road side units (RSU). On the other hand, for long range transmission, it is intended to use transmission over the Uu interface between a UE and a base station, in which case packets may be disseminated to different ITS service providers which could be road traffic authorities, road operators, automotive original equipment manufacturers OEMs, cellular operators, etc.

When it comes to the sidelink interface, the first standardization effort in 3GPP dates back to Rel.12, targeting public safety use cases. Since then, a number of enhancements have been introduced with the objective to enlarge the use cases that could benefit from the D2D technology. In particular, in LTE Rel-14 and Rel-15, the extensions for the device-to-device work include support of vehicle-to-anything V2X communication, including any combination of direct communication between vehicles, pedestrians and infrastructure.

While Long Term Evolution LTE V2X mainly aims at traffic safety services, New Radio NR V2X may have a much broader scope including not only basic safety services but also targeting non-safety applications, such as sensor/data sharing between vehicles with an objective to strengthen perception of the surrounding environment. Hence a new set of applications, such as vehicles platooning, cooperative maneuver between vehicles, remote/autonomous driving may enjoy such enhanced sidelink framework.

In this new context, expected requirements to meet desired/needed data rate, capacity, reliability, latency, communication range, and/or speed may be made more stringent. For example, given the variety of services that can be transmitted over the sidelink SL, a robust Quality of Service QoS framework which takes into account the different performance requirements of the different V2X services may be useful/needed. Additionally, new radio protocols to handle more robust and reliable communication may be desired/designed. All of this is currently under the investigation of 3GPP in NR Rel.16.

Related to reliability, one enhancement that may be useful/necessary is the introduction of SL hybrid automatic repeat request HARQ retransmissions. For this reason, in NR, HARQ processes for SL unicast and groupcast support a dedicated sidelink feedback channel, referred to as Physical Sidelink Feedback Channel PSFCH. There are two options in terms of HARQ feedback signaling.

- ACK/NACK (Acknowledgement/Negative-ACK): Basically, when configured, the receiver UE feedbacks an ACK or NACK to the transmitter UE indicating if the Transport Block (TB) transmitted over the data channel (i.e., Physical Sidelink Shared Channel PSSCH) is received correctly or not, respectively. If it's NACK, the transmitter UE will retransmit the same TB until ACK is received or until the maximum number of retransmissions is reached. FIG. 2A illustrates HARQ processes/operations in sidelink with ACK/NACK.
- NACK only: In this option, the UE is configured to send NACK when the reception fails and to not send any feedback when the reception succeeds. That is, if the receiver UE decodes the scheduling assignment (SA) but fails to decode the TB, it transmits a NACK. Otherwise (i.e., if it correctly decodes both SA and TB or if it fails to decode the SA), it does not transmit anything. If the TX UE does not receive NACK, it assumes that the reception was successful and can therefore transmit new TBs. However, in this case, there is no distinction between the cases when a receiver UE does not send any feedback due to failed control information decoding and when the receiver UE decodes data successfully but decides not to send the feedback. FIG. 2B illustrates HARQ processes/operations in sidelink with NACK only.

The need of HARQ feedback for a given TB may be signaled by the transmitting UE providing an indication in SCI (Sidelink Control Information). Besides, the transmitting TX UE can also perform blind HARQ without any ACK/NACK feedback. For instance, in LTE V2X, TX UE can be configured to transmit the same TB twice by default and RX UE soft combines those two received TBs when decoding. Blind HARQ saves the ACK/NACK feedback signaling with the cost of possible resource wastage (e.g., if the first TB is received) and reception failure due to not enough retransmission.

HARQ enabling/disabling is discussed below.

Among different V2X applications/services, some applications/services may require high reliability and some applications/services may require low latency. From this aspect, HARQ procedures may not be needed for those applications/services that require low latency but can tolerate low reliability. Comparatively, HARQ procedures may be beneficial for applications/services requiring high reliability and that can tolerate high latency. For the sake of flexibility, NR SL supports enabling and disabling HARQ procedures on demand L1/L2 (Layer-1/Layer-2) identifiers IDs are discussed below.

SL transmissions are associated with a source L1/L2 ID and a destination L1/L2 ID.

For SL unicast, an L1/L2 source ID represents the service type and/or transmitter UE ID, which will become the L1/L2 destination ID of the peer UE.

For SL groupcast, an L1/L2 source ID represents the transmitter UE ID, and L1/L2 destination ID represents the group identifier provided by the upper layer or the service type.

For SL broadcast, an L1/L2 source ID represents the transmitter UE ID, and L1/L2 destination ID represents the service type.

Note that for the same service type, different applications with different QoS requirements may be associated. For instance, a platooning service may include a video sharing application and a control messaging application.

With NR Uu it is the gNb that determines if HARQ feedback is needed and schedules the UE to send HARQ feedback. With introducing HARQ feedback in NR SL it is now up to the UE to determine which HARQ configuration is to be used for transmission of a Transport Block. At the MAC layer, the UE has to multiplex different MAC PDUs from same or different sidelink radio bearers to generate a Transport Block. However different radio bearers maybe (pre)configured to adopt different HARQ configuration, i.e. enabled/disabled HARQ retransmission, ACK and NACK feedback, NACK only feedback and other configuration settings. Then it is a question how the UE, in the light of the above, determines the HARQ configuration of the generated Transport Block.

SUMMARY

According to some embodiments of inventive concepts, a method of operating a wireless device providing sidelink SL communications may be provided. A plurality of service data units SDUs may be generated, wherein each of the SDUs is associated with a respective service, wherein a first SDU of the plurality of SDUs is associated with a first service and a first sidelink SL hybrid automatic repeat request HARQ configuration, and wherein a second SDU of the plurality of SDUs is associated with a second service and a second SL HARQ configuration different that the first SL HARQ configuration. The plurality of SDUs may be multiplexed into a transport block TB (e.g., a protocol data unit, PDU, TB) so that the TB includes the first and second SDUs. A SL HARQ configuration may be selected for the TB based on at least one of the first SL HARQ configuration associated with the first SDU and the second SL HARQ configuration associated with the second SDU. The TB may be transmitted over a sidelink to at least one other wireless device using the SL HARQ configuration selected for the TB.

According to some other embodiments of inventive concepts, a method of operating a wireless device providing sidelink SL communications may be provided. A plurality of first service data units SDUs may be generated for a first service associated with a first sidelink hybrid automatic repeat request SL HARQ configuration and a first source/destination address. A plurality of second SDUs may be generated for a second service associated with a second SL HARQ configuration and a second source/destination address. A first transport block TB may be generated including the plurality of first SDUs and the first source/destination address. The first TB including the first plurality of SDUs and the first source/destination address may be transmitted over a sidelink using the first SL HARQ configuration based on the first source/destination address. A second transport block TB may be generated including the second plurality of SDUs and the second source/destination address. The second TB including the second plurality of SDUs and the second source/destination address may be transmitted over the sidelink using the second SL HARQ configuration based on the second source/destination address.

According to still other embodiments of inventive concepts, a method of operating a wireless device providing sidelink SL communications may be provided. A first transport block TB may be received including a first plurality of SDUs and a first source/destination address over a sidelink. A first SL hybrid automatic repeat request HARQ configuration associated with the first TB may be identified based on the first source/destination address. The first TB may be processed in accordance with the first SL HARQ configuration. A second TB including a second plurality of SDUs and a second source/destination address may be received over the sidelink. A second SL HARQ configuration associated with the second TB may be identified based on the second source/destination address. The second TB may be processed in accordance with the second SL HARQ configuration.

According to yet other embodiments, a method of operating a wireless device providing sidelink SL communications may be provided. A plurality of service data units SDUs may be generated wherein each of the SDUs is associated with a respective service. The plurality of SDUs may be multiplexed into a transport block TB (e.g., a protocol data unit, PDU, TB) so that the TB includes the plurality of SDUs. A SL HARQ configuration may be selected for the TB based on at least one of a first SL HARQ configuration associated with a first SL radio bearer configured for the wireless device and a second SL HARQ configuration associated a second SL radio bearer configured for the wireless device. The TB may be transmitted over a sidelink to at least one other wireless device using the SL HARQ configuration selected for the TB.

According to further embodiments of inventive concepts, a method of operating a wireless device providing sidelink SL communications may be provided. A plurality of service data units SDUs may be generated including first SDUs associated with a first SL hybrid automatic repeat request HARQ configuration, and second SDUs associated a second SL HARQ configuration different than the first HARQ configuration. The first SDUs may be multiplexed into a first transport block TB so that the first TB includes the first SDUs associated with the first SL HARQ configuration without any of the second SDUs associated with the second SL HARQ configuration. The first TB may be transmitted over a sidelink to at least one other wireless device using the first SL HARQ configuration. The second SDUs may be multiplexed into a second transport block TB so that the second TB includes the second SDUs associated with the second SL HARQ configuration without any of the first SDUs associated with the first SL HARQ configuration. The second TB may be transmitted over a sidelink to at least one other wireless device using the second SL HARQ configuration.

Performance of SL communications may be thus be improved according to some embodiments of inventive concepts.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
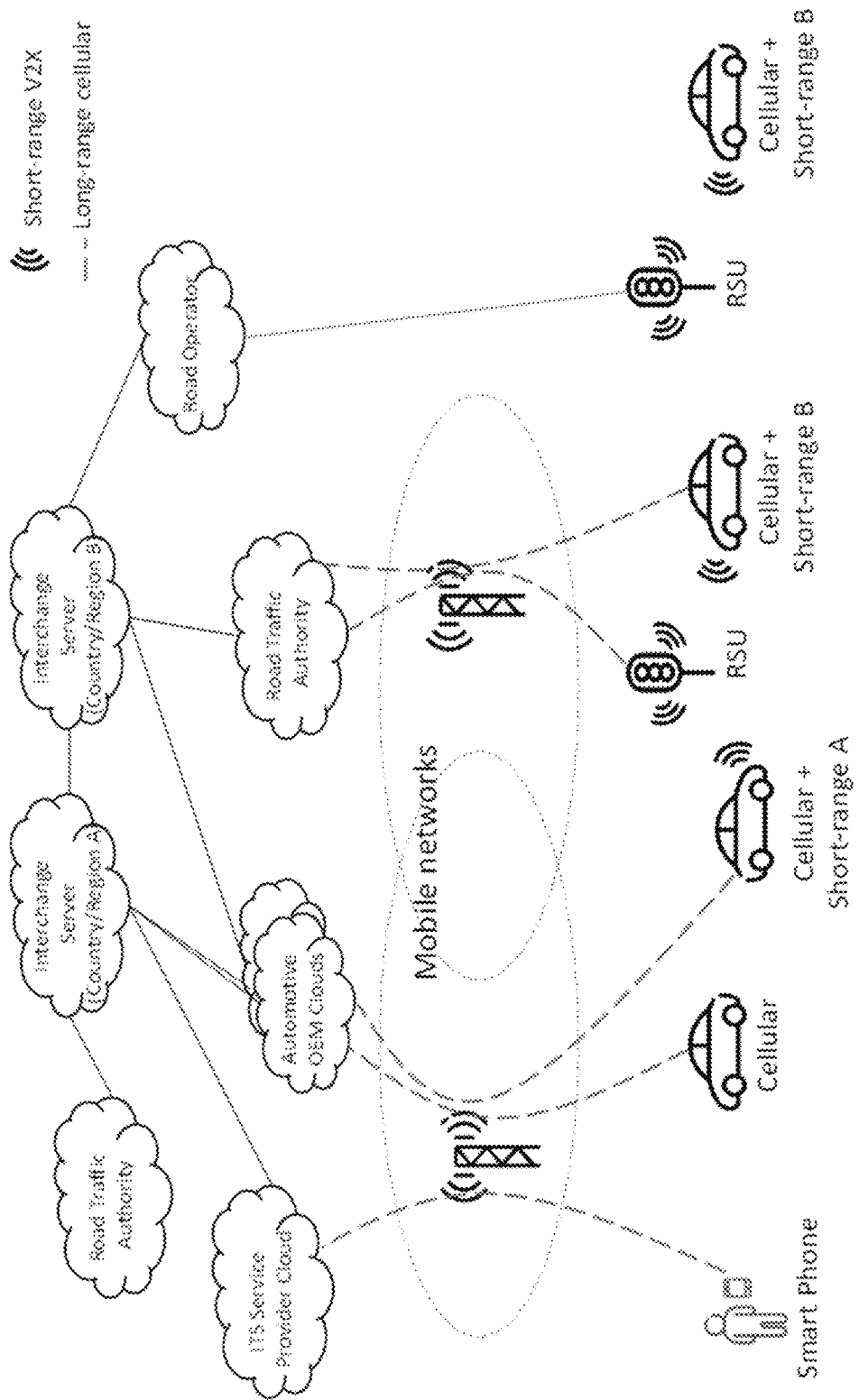
FIG. 1 is a schematic diagram illustrating a C-ITS environment.
Figure 2A:
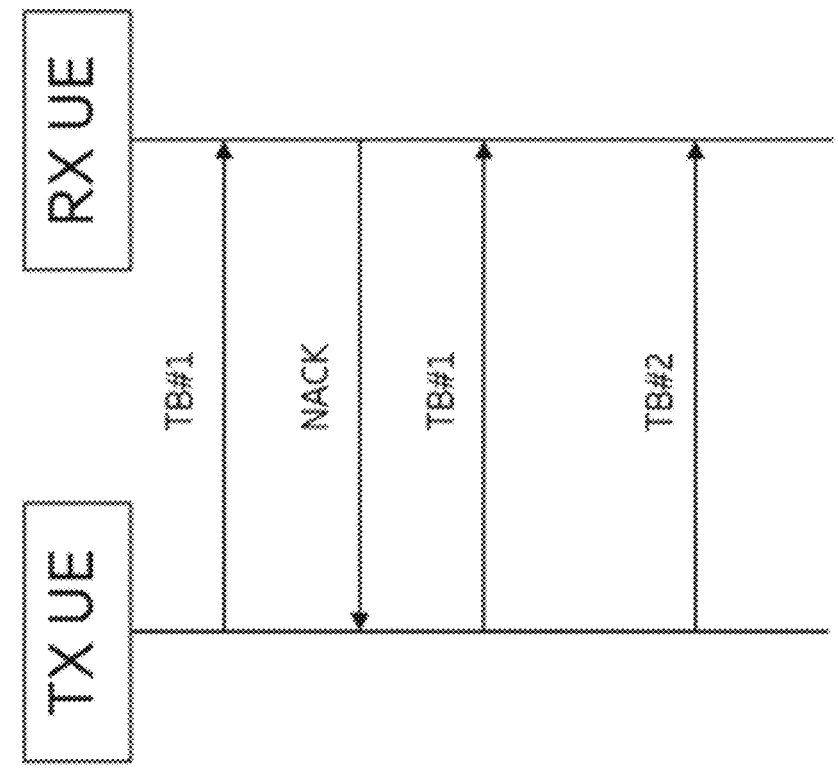
FIG. 2A is a message diagram illustrating a HARQ process in sidelink with ACK/NACK feedback.
Figure 2B:
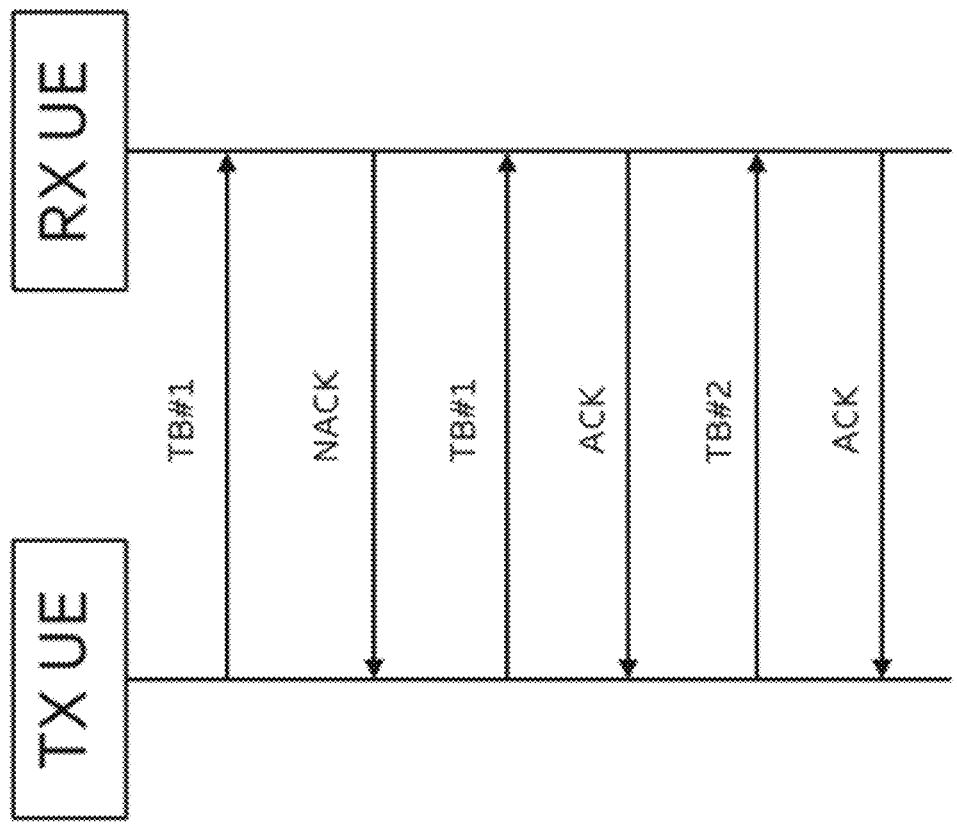
FIG. 2B is a message diagram illustrating a HARQ process in sidelink with NACK only.
Figure 3:
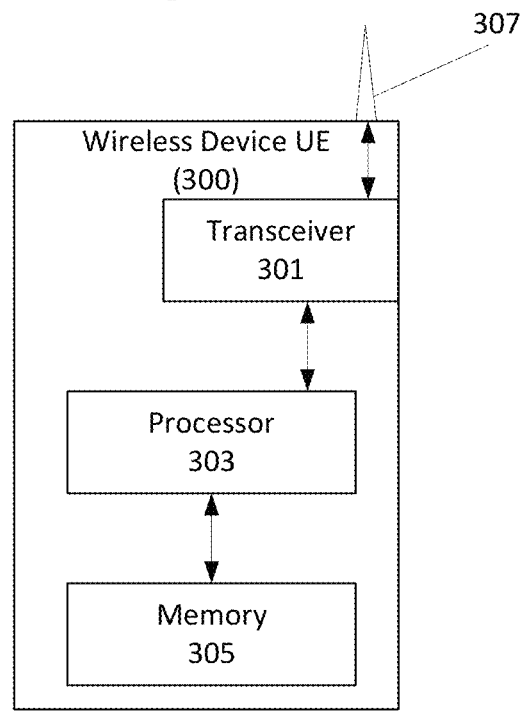
FIG. 3 is a block diagram illustrating a wireless device UE according to some embodiments of inventive concepts.

FIG. 3 is a block diagram illustrating elements of a wireless device UE 300 (also referred to as a mobile terminal, a mobile communication terminal, a wireless communication device, a wireless terminal, mobile device, a wireless communication terminal, user equipment, UE, a user equipment node/terminal/device, etc.) configured to provide wireless communication according to embodiments of inventive concepts. (Wireless device 300 may be provided, for example, as discussed below with respect to wireless device QQ110 of FIG. QQ1.) As shown, wireless device UE may include an antenna 307 (e.g., corresponding to antenna QQ111 of FIG. QQ1), and transceiver circuitry 301 (also referred to as a transceiver, e.g., corresponding to interface QQ114 of FIG. QQ1). The transceiver circuitry 301 may include a transmitter and a receiver configured to provide: uplink and downlink radio communications with a base station(s) (e.g., corresponding to network node QQ160 of FIG. QQ1, also referred to as a RAN node) of a radio access network; and/or to provide sidelink SL communications to/from one or more other wireless devices. Wireless device UE may also include processing circuitry 303 (also referred to as a processor, e.g., corresponding to processing circuitry QQ120 of FIG. QQ1) coupled to the transceiver circuitry, and memory circuitry 305 (also referred to as memory, e.g., corresponding to device readable medium QQ130 of FIG. QQ1) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required. Wireless device UE may also include an interface (such as a user interface) coupled with processing circuitry 303, and/or wireless device UE may be incorporated in a vehicle.

As discussed herein, operations of wireless device UE may be performed by processing circuitry 303 and/or transceiver circuitry 301. For example, processing circuitry 303 may control transceiver circuitry 301 to transmit communications through transceiver circuitry 301 over a radio interface to a radio access network node (also referred to as a base station) and/or to receive communications through transceiver circuitry 301 from a RAN node over a radio interface. Processing circuitry 303 may also control transceiver circuitry 301 to transmit communications through transceiver circuitry 301 over a sidelink radio interface to another wireless device(s) and/or to receive communications through transceiver circuitry 301 from another wireless device(s) over a sidelink radio interface. Moreover, modules may be stored in memory circuitry 305, and these modules may provide instructions so that when instructions of a module are executed by processing circuitry 303, processing circuitry 303 performs respective operations (e.g., operations discussed below with respect to Example Embodiments relating to wireless devices).

Figure 4:
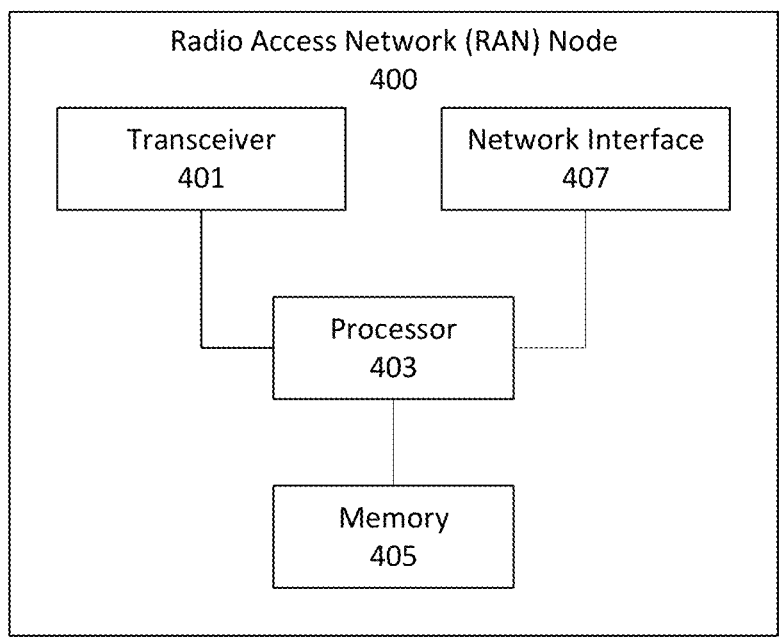
FIG. 4 is a block diagram illustrating a radio access network RAN node (e.g., a base station eNB/gNB) according to some embodiments of inventive concepts.

FIG. 4 is a block diagram illustrating elements of a radio access network RAN node 400 (also referred to as a network node, base station, eNodeB/eNB, gNodeB/gNB, etc.) of a Radio Access Network (RAN) configured to provide cellular communication according to embodiments of inventive concepts. (RAN node 400 may be provided, for example, as discussed below with respect to network node QQ160 of FIG. QQ1.) As shown, the RAN node may include transceiver circuitry 401 (also referred to as a transceiver, e.g., corresponding to portions of interface QQ190 of FIG. QQ1) including a transmitter and a receiver configured to provide uplink and downlink radio communications with mobile terminals. The RAN node may include network interface circuitry 407 (also referred to as a network interface, e.g., corresponding to portions of interface QQ190 of FIG. QQ1) configured to provide communications with other nodes (e.g., with other base stations) of the RAN and/or core network CN. The network node may also include processing circuitry 403 (also referred to as a processor, e.g., corresponding to processing circuitry QQ170) coupled to the transceiver circuitry, and memory circuitry 405 (also referred to as memory, e.g., corresponding to device readable medium QQ180 of Figure QQ1) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the RAN node may be performed by processing circuitry 403, network interface 407, and/or transceiver 401. For example, processing circuitry 403 may control transceiver 401 to transmit downlink communications through transceiver 401 over a radio interface to one or more mobile terminals UEs and/or to receive uplink communications through transceiver 401 from one or more mobile terminals UEs over a radio interface. Similarly, processing circuitry 403 may control network interface 407 to transmit communications through network interface 407 to one or more other network nodes and/or to receive communications through network interface from one or more other network nodes. Moreover, modules may be stored in memory 405, and these modules may provide instructions so that when instructions of a module are executed by processing circuitry 403, processing circuitry 403 performs respective operations.

According to some other embodiments, a network node may be implemented as a core network CN node without a transceiver. In such embodiments, transmission to a wireless device UE may be initiated by the network node so that transmission to the wireless device is provided through a network node including a transceiver (e.g., through a base station or RAN node). According to embodiments where the network node is a RAN node including a transceiver, initiating transmission may include transmitting through the transceiver.

Figure 5:
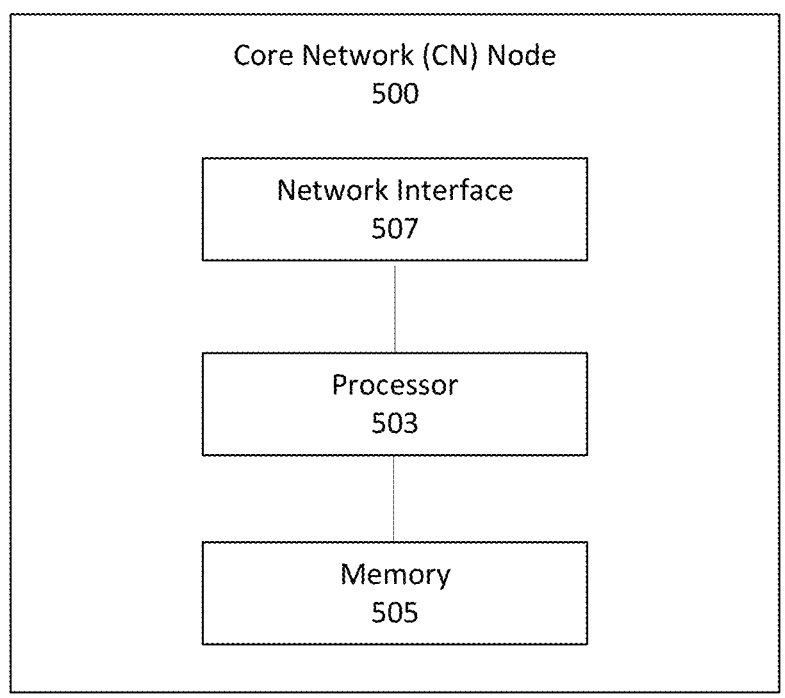
FIG. 5 is a block diagram illustrating a core network CN node (e.g., an AMF node, an SMF node, etc.) according to some embodiments of inventive concepts.

FIG. 5 is a block diagram illustrating elements of a core network CN node (e.g., an SMF node, an AMF node, etc.) of a communication network configured to provide cellular communication according to embodiments of inventive concepts. As shown, the CN node may include network interface circuitry 507 (also referred to as a network interface) configured to provide communications with other nodes of the core network and/or the radio access network RAN. The CN node may also include a processing circuitry 503 (also referred to as a processor) coupled to the network interface circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the CN node may be performed by processing circuitry 503 and/or network interface circuitry 507. For example, processing circuitry 503 may control network interface circuitry 507 to transmit communications through network interface circuitry 507 to one or more other network nodes and/or to receive communications through network interface circuitry from one or more other network nodes. Moreover, modules may be stored in memory 505, and these modules may provide instructions so that when instructions of a module are executed by processing circuitry 503, processing circuitry 503 performs respective operations.

Considering the situation that one UE is running multiple of applications/services, HARQ procedures may be enabled for some services while disabled for others, and the association between SL link/SLRB/LCH/TB and/or if HARQ is enabled or not may not be clear.

In addition, it may be an issue how an SL unicast/groupcast UE informs the peer UE if the HARQ is enabled/disabled for the current/new SL link/SLRB/LCH/TB, and/or how the peer UE knows if HARQ feedback should be sent or not.

According to some embodiments of inventive concepts, methods may be provided to handle SL HARQ configuration at access stratum AS, including the association between SL HARQ configuration with L1/L2 ID and SLRB/LCH. Methods may also be provided for a medium access control MAC entity to multiplex MAC service data units SDUs to MAC protocol data units PDUs considering different SL HARQ configurations are described according to some embodiments.

For some embodiments, whether HARQ procedures are useful/needed or not may be known/determined based on the QoS requirements. Some embodiments of the present disclosure focus on the treatment at access stratum AS with the coexistence of some applications requiring HARQ retransmission and some other applications not requiring HARQ retransmission. The following embodiments may be applicable to the case in which a SL communication is performed between one UE and another UE over the PC5 interface (i.e. sidelink unicast), or between one UE and multiple UEs over the PC5 interface (i.e. sidelink groupcast).

SL HARQ configuration is discussed below.

In some first embodiments, a UE may be configured by a network node (e.g., a gNB radio access network node, also referred to as a base station) or preconfigured with one or more SL HARQ configurations, wherein each SL HARQ configuration may be applicable to the transmission of one or more specific V2X services, and wherein the HARQ configuration to be applied for a given packet transmission (i.e., a TB transmission) depends on the services being transmitted by the UE.

In some second embodiments, the aforementioned HARQ configuration may include one or more of the following indications:
  Whether HARQ retransmissions are enabled or not;
  If HARQ is enabled, the maximum allowed number of retransmissions that shall be performed
  If HARQ is enabled, whether HARQ feedback is enabled or disabled
  If HARQ feedback is enabled, the time gap between PSFCH and associated PSSCH
  The one or more specific V2X services to which the above indications apply In some third embodiments, each V2X service associated with a specific HARQ configuration may be represented by any of the following:

L1/L2 destination (DST) ID to be used for this service as indicated by higher layers Logical Channel Identifier LCID, identifying a logical channel (LCH) to be used for this service as indicated by network NW configuration or preconfiguration Logical channel group (LCG), identifying the logical channels (LCH) to be used for the V2X services as indicated by NW configuration or preconfiguration SL Radio bearer identity (SLRB ID), identifying the SL radio bearer to be used for transmissions of packets associated with this service Quality of Service QoS flow ID (QFI), identifying the QoS flow associated with the V2X service $5^{th}$ Generation 5G QoS ID 5QI, identifying the QoS characteristics of the V2X service In some fourth embodiments, an association between one V2X service and the HARQ configuration may be provisioned to the UE by any of one or more of the following mechanisms:

For each HARQ configuration it is indicated the one or more V2X services to be associated with such HARQ configuration For each V2X service, it is indicated the specific HARQ configuration to be associated with such service The above mechanisms may be signaled, for example, via system information block SIB signaling or dedicated radio resource control RRC configuration. For example, as part of the SL bearer configuration, the gNB may indicate the HARQ configuration to be applicable to the logical channel (s) associated with this SL bearer, or as part of SL mode resource pool configuration (i.e., mode-1/mode2 resource configuration), the UE may indicate the HARQ configuration and the associated V2X services that are allowed to use this mode. When configuring the service-HARQ configuration association, the gNB may ensure that all the logical channels associated with the same service (e.g. to the same L1/L2 ID) are configured with the same HARQ configuration.

In some fifth embodiments, the specific HARQ configuration to be applied for a given packet transmission in a transmission time interval TTI (i.e., a TB transmission) depend on the HARQ configurations associated with the different V2X services that the UE is being transmitted. In particular, the following criteria may be applicable:

The UE applies for this TB transmission the HARQ configuration associated with the service of highest priority (e.g. associated with highest priority LCH) among the services being transmitted. For example, if the HARQ configuration, whose content is disclosed in the second embodiments discussed above, of the highest priority service being transmitted indicates that HARQ transmissions are not enabled, the UE does not perform HARQ retransmission for this TB, and vice versa if the HARQ configuration indicates that HARQ retransmissions are enabled for the highest priority service being transmitted. Similarly, if the HARQ configuration of the highest priority service being transmitted indicates that HARQ feedback is not enabled, the transmitting UE does not request HARQ feedback for this TB, and vice versa if the HARQ configuration indicates that HARQ feedbacks are enabled for the highest priority service being transmitted.

The UE enables HARQ retransmission for this TB if any service being transmitted is associated with a HARQ configuration for which HARQ retransmissions are enabled. Otherwise the UE does not enable HARQ retransmissions.

The UE enables HARQ retransmission for this TB only if all services being transmitted are associated with a HARQ configuration for which HARQ retransmissions are enabled. Otherwise the UE does not enable HARQ retransmissions.

The UE enables HARQ feedback for this TB if any service being transmitted is associated with a HARQ configuration for which HARQ feedback is enabled. Otherwise the UE does not enable HARQ feedback.

The UE enables HARQ feedback for this TB only if all services being transmitted are associated with a HARQ configuration for which HARQ feedback is enabled. Otherwise the UE does not enable HARQ feedback for this TB.

In some sixth embodiments, including the fifth embodiments discussed above, wherein for V2X services being transmitted may be intended any of the following:

1. The V2X services multiplexed into the same MAC PDU, i.e. the HARQ configuration to be used for the transmission of the MAC PDU in a TTI depends on the HARQ configurations configured, according to previous embodiments, for the V2X services associated with the MAC SDUs multiplexed into the MAC PDU 2. The V2X services for which the UE has an SL bearer and/or a QoS flow established and not yet released, i.e., the HARQ configuration to be used for the transmission of the MAC PDU in a TTI depends on the HARQ configurations configured, according to previous embodiments, for the V2X services for which the UE has a SL bearer and/or QoS flow established.

3. The V2X services that the UE is receiving from upper layers and not yet released, i.e., the HARQ configuration to be used for the transmission of the MAC PDU in a TTI depends on the HARQ configurations configured, according to previous embodiments, for the V2X services associated with the packets that the UE is currently receiving from application layer for transmission.

4. The V2X services that the UE has in the SL buffer waiting for transmission, i.e., the HARQ configuration to be used for the transmission of the MAC PDU in a TTI depends on the HARQ configurations configured, according to previous embodiments, for the V2X services associated with the packets that the UE has in the buffer when building the MAC PDU.

5. The V2X services that the UE has been transmitting in a time window, i.e., the HARQ configuration to be used for the transmission of the MAC PDU in a TTI depends on the HARQ configurations configured, according to previous embodiments, for the V2X services that the UE has transmitted during the X seconds before this TTI In the following, some examples are considered leveraging fifth and sixth embodiments discussed above.

In one example, the UE considers the HARQ configurations configured for the services, e.g., represented by LCID, associated with the MAC SDUs multiplexed into a MAC PDU for transmission in this TTI. If there is at least one MAC SDU carrying a service for which HARQ feedback is enabled, the UE enables HARQ feedback for the whole MAC PDU, otherwise it does not. Similarly, if there is at least one MAC SDU carrying a service for which HARQ retransmissions are enabled, the UE enables HARQ retransmissions for the whole MAC PDU, otherwise it does not.

In another example, similar to the above, the UE just considers the HARQ configurations configured for the services that the UE is receiving from higher layers for transmission. If a service is not received any more from higher layers, e.g., upon explicit indication from higher layers, or simply as a consequence of higher layers not injecting the service into AS layers, the UE does not consider anymore the HARQ configuration associated with this service. Therefore, if there is at least one service among the ones being transmitted for which HARQ retransmissions are enabled, then HARQ retransmissions are enabled for each MAC PDU. Similarly, for the HARQ feedbacks.

In some seventh embodiments, depending on the HARQ configuration selected as per fifth and sixth embodiments, the MAC layer instructs the physical layer to adopt the selected HARQ configuration, e.g., the Physical PHY layer indicates in the SCI that HARQ feedbacks are requested for this TB. Also, MAC allocates the HARQ buffer if HARQ retransmissions and/or HARQ feedback are enabled until a maximum number of retransmissions are performed or an ACK is received.

In some embodiments, for SL unicast, when one UE triggers the establishment of the unicast link or unicast SLRB, it also provides the relevant HARQ configuration and its association with L1/L2 ID and HARQ process ID/SLRB ID to the peer UE.

In case only a single HARQ configuration can be applied to a MAC entity.
  The Tx UE determines whether a TB should be stored in the HARQ buffer for retransmission based on L1/L2 SRC and DST ID when generating the TB.
  The Rx UE determines whether a TB should be stored in HARQ buffer for HARQ combining and whether a HARQ feedback should be sent based on L1/L2 SRC and DST ID included in the SCI associated with the received TB.

In case different HARQ configurations can be applied to different HARQ processes of a MAC entity:
  The Tx UE determines whether a TB delivered via a certain HARQ process should be stored in the HARQ buffer for retransmission based on L1/L2 source SRC and destination DST ID and also the HARQ process ID when generating the TB.
  The Rx UE determines whether a TB received via a certain HARQ process should be stored in HARQ buffer for HARQ combining and whether a HARQ feedback should be sent based on L1/L2 SRC and DST ID and also the HARQ process ID included in the SCI associated with the received TB. MAC multiplexing is discussed below.

In some embodiments, at MAC layer, a MAC entity multiplexes MAC SDUs into one MAC PDU, i.e., TB, only if such MAC SDUs are associated with the same L1/L2 DST ID. In case HARQ configuration is per L1/L2 DST ID, then the TB inherits the same HARQ configuration, and the gNB shall configure the same HARQ configuration for all the logical channels associated with the same L1/L2 destination.

In other embodiments, a MAC entity can multiplex data from different SLRBs/LCHs into the same TB only if the HARQ configuration of those SLRBs/LCHs are the same, e.g., only if all the HARQ configurations of those SLRBs/LCHs indicate HARQ retransmissions enabled (or disabled) or HARQ feedback enabled (or disabled). SLRBs/LCHs with different HARQ configurations will be multiplexed in different HARQ entities. In this case, a single HARQ configuration is applied to the HARQ entity.

In other embodiments, in case a single HARQ configuration is applied to the MAC entity, the MAC entity can still multiplex data from different SLRBs/LCHs into the same TB even if the HARQ configuration of those SLRBs/LCHs are different. In this case, the HARQ configuration of the TB can be:
  The generated TB inherits the HARQ configuration of the SLRBs/LCHs of the highest priority, as discussed above with respect to fifth embodiments
  The generated TB takes the most stringent value from different HARQ configurations, e.g., HARQ is enabled if it is enabled for any associated SLRB/LCH, and the time gap between PSFCH and associated PSSCH selects the minimum value, as discussed above in some examples with respect to fifth embodiments. In this case also, a single HARQ configuration is applied to the MAC entity.

In yet other embodiments, a MAC entity can also multiplex data from different SLRBs/LCHs with different HARQ configurations into the same TB. SLRBs/LCHs with different HARQ configurations could be delivered to different HARQ processes. Some HARQ processes could be (pre) configured for transmissions where HARQ retransmission/HARQ feedback is enabled while some other HARQ processes could be (pre)configured for transmissions where HARQ retransmission/HARQ feedback is disabled. The L1 SRC and DST ID together with the HARQ ID in SCI could indicate the HARQ configurations of the HARQ process used to transmit the TB associated with the SCI. In this case multiple HARQ configurations may be applied to the MAC entity.

Operations of the wireless device 300 (implemented using the structure of the block diagram of FIG. 3) will now be discussed with reference to the flow chart of FIG. 6 according to some embodiments of inventive concepts. For example, modules may be stored in memory 305 of FIG. 3, and these modules may provide instructions so that when the instructions of a module are executed by respective wireless device processing circuitry 303, processing circuitry 303 performs respective operations of the flow chart.

At block 601, processing circuitry 303 may receive (through transceiver 301) associations between a first service and a first SL HARQ configuration and between a second service and a second SL HARQ configuration from a radio access network. At block 603, processing circuitry 303 may generate a plurality of service data units SDUs, wherein each of the SDUs is associated with a respective service, wherein a first SDU of the plurality of SDUs is associated with a first service and a first sidelink SL hybrid automatic repeat request HARQ configuration, and wherein a second SDU of the plurality of SDUs is associated with a second service and a second SL HARQ configuration different that the first SL HARQ configuration.

At block 607, processing circuitry 303 may multiplex the plurality of SDUs into a transport block TB, (e.g., a protocol data unit PDU TB) so that the TB includes the first and second SDUs. At block 611, processing circuitry 303 may select a SL HARQ configuration for the TB based on at least one of the first SL HARQ configuration associated with the first SDU and the second SL HARQ configuration associated with the second SDU. At block 615, processing circuitry 303 may transmit the TB (through transceiver 301) over a sidelink to at least one other wireless device using the SL HARQ configuration selected for the TB.

Figure 6:
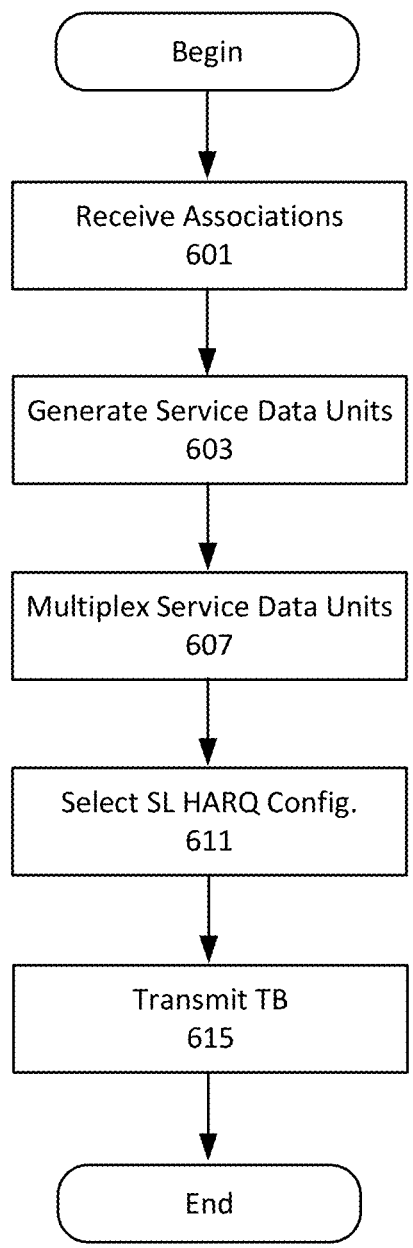
FIG. 6-10 are flow charts illustrating operations of wireless devices according to some embodiments of inventive concepts.

Various operations from the flow chart of FIG. 6 may be optional with respect to some embodiments of wireless devices and related methods. Regarding methods of example embodiment 1 (set forth below), for example, operations of block 601 of FIG. 6 may be optional.

Operations of the wireless device 300 (implemented using the structure of the block diagram of FIG. 3) will now be discussed with reference to the flow chart of FIG. 7 according to some embodiments of inventive concepts. For example, modules may be stored in memory 305 of FIG. 3, and these modules may provide instructions so that when the instructions of a module are executed by respective wireless device processing circuitry 303, processing circuitry 303 performs respective operations of the flow chart.

At block 703, processing circuitry 303 may generate a plurality of first service data units SDUs for a first service associated with a first sidelink hybrid automatic repeat request SL HARQ configuration and a first source/destination address, wherein the first SL HARQ configuration provides HARQ retransmission. At block 707, processing circuitry 303 may generate a plurality of second SDUs for a second service associated with a second SL HARQ configuration and a second source/destination address, wherein the second SL HARQ configuration provides no HARQ retransmission.

At block 711, processing circuitry 303 may generate a first transport block TB including the plurality of first SDUs and the first source/destination address. At block 715, processing circuitry 303 may transmit the first TB including the first plurality of SDUs and the first source/destination address (through transceiver 301) over a sidelink using the first SL HARQ configuration based on the first source/destination address. At block 717, processing circuitry 303 may store the first TB in a HARQ buffer for retransmission based on the first source/destination address.

At block 719, processing circuitry 303 may generate a second transport block TB including the second plurality of SDUs and the second source/destination address. At block 723, processing circuitry 303 may transmit the second TB including the second plurality of SDUs and the second source/destination address (through transceiver 301) over the sidelink using the second SL HARQ configuration based on the second source/destination address without storing the second TB in a HARQ buffer.

Figure 7:
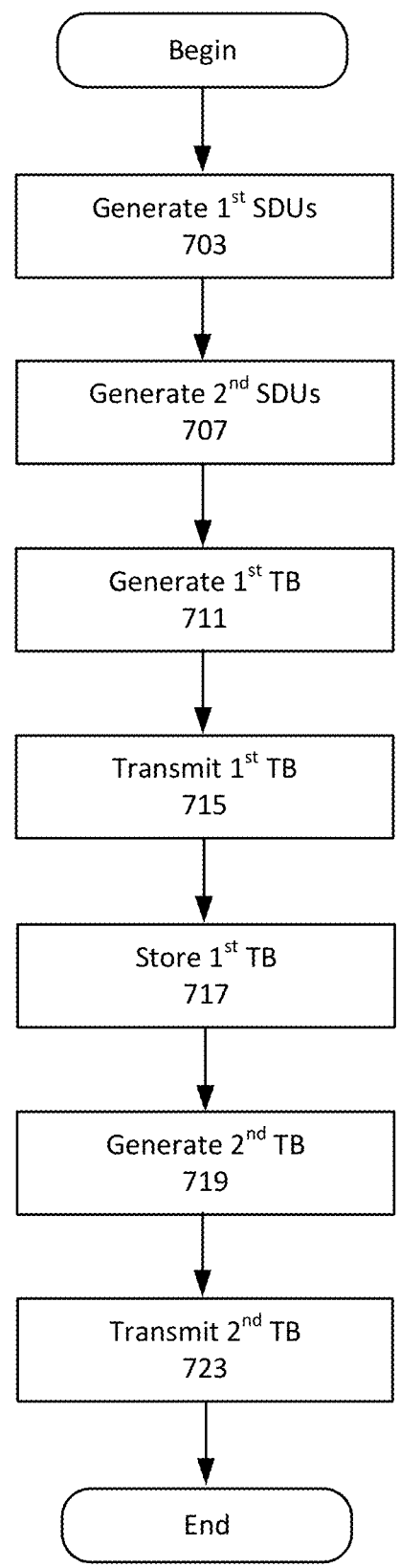

Various operations from the flow chart of FIG. 7 may be optional with respect to some embodiments of wireless devices and related methods. Regarding methods of example embodiment 25 (set forth below), for example, operations of block 717 of FIG. 7 may be optional.

Operations of the wireless device 300 (implemented using the structure of the block diagram of FIG. 3) will now be discussed with reference to the flow chart of FIG. 8 according to some embodiments of inventive concepts. For example, modules may be stored in memory 305 of FIG. 3, and these modules may provide instructions so that when the instructions of a module are executed by respective wireless device processing circuitry 303, processing circuitry 303 performs respective operations of the flow chart. Operations of FIG. 8, for example, may be performed by a wireless device receiving one or more transport blocks over a sidelink(s) from another wireless device/devices transmitting TBs in accordance with operations of FIG. 7.

At block 803, processing circuitry 303 may receive a first transport block TB including a first plurality of SDUs and a first source/destination address (through transceiver 301) over a sidelink. At block 807, processing circuitry 303 may identify a first SL hybrid automatic repeat request HARQ configuration associated with the first TB based on the first source/destination address. At block 811, processing circuitry 303 may process the first TB in accordance with the first SL HARQ configuration.

At block 815, processing circuitry 303 may receive a second TB including a second plurality of SDUs and a second source/destination address (through transceiver 301) over the sidelink. At block 819, processing circuitry 303 may identify a second SL HARQ configuration associated with the second TB based on the second source/destination address. At block 823, processing circuitry 303 may process the second TB in accordance with the second SL HARQ configuration.

Figure 8:
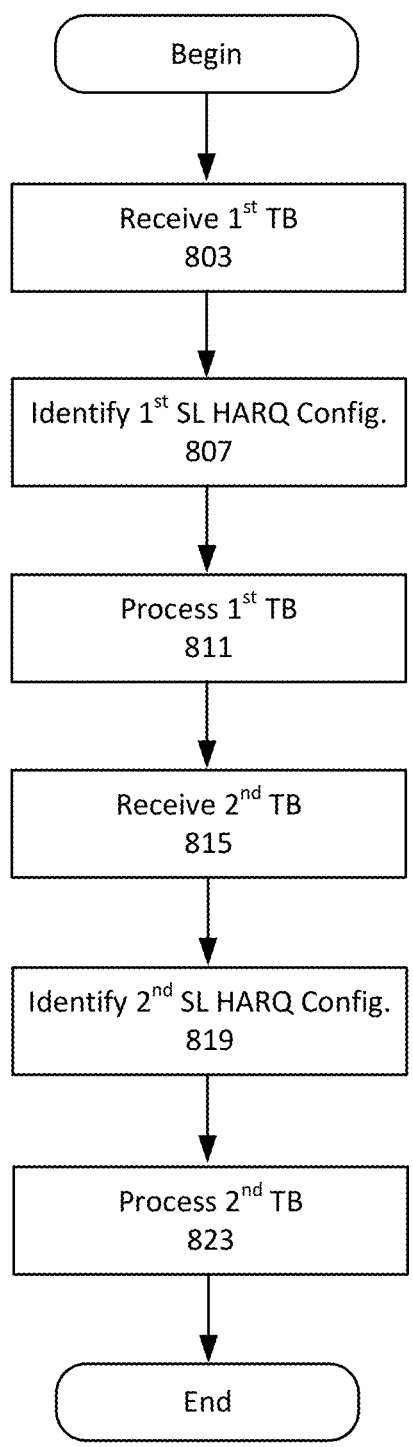

Various operations from the flow chart of FIG. 8 may be optional with respect to some embodiments of wireless devices and related methods.

Figure 9:
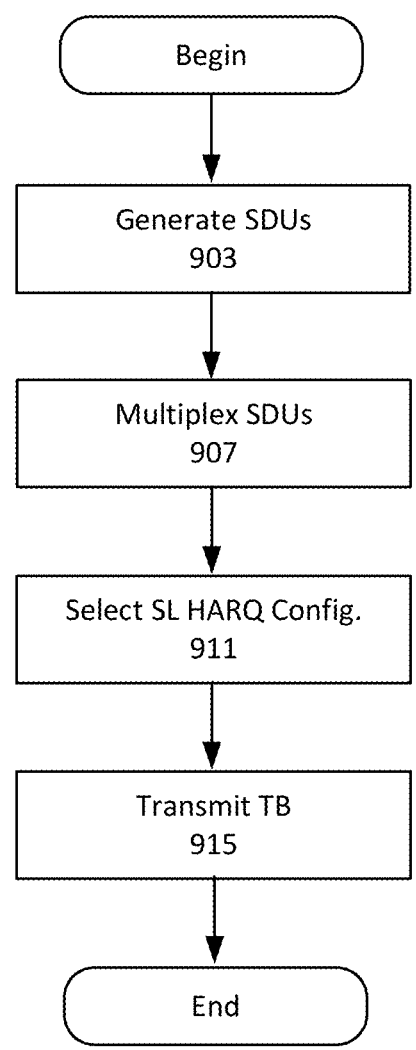

Operations of the wireless device 300 (implemented using the structure of the block diagram of FIG. 3) will now be discussed with reference to the flow chart of FIG. 9 according to some embodiments of inventive concepts. For example, modules may be stored in memory 305 of FIG. 3, and these modules may provide instructions so that when the instructions of a module are executed by respective wireless device processing circuitry 303, processing circuitry 303 performs respective operations of the flow chart.

At block 903, processing circuitry 303 may generate a plurality of service data units SDUs wherein each of the SDUs is associated with a respective service. At block 907, processing circuitry 303 may multiplex the plurality of SDUs into a transport block TB (e.g., a protocol data unit PDU TB) so that the TB includes the plurality of SDUs.

At block 911, processing circuitry 303 may select a SL HARQ configuration for the TB based on at least one of a first SL HARQ configuration associated with a first SL radio bearer configured for the wireless device and a second SL HARQ configuration associated a second SL radio bearer configured for the wireless device. At block 915, processing circuitry 303 may transmit the TB over a sidelink to at least one other wireless device using the SL HARQ configuration selected for the TB.

Various operations from the flow chart of FIG. 8 may be optional with respect to some embodiments of wireless devices and related methods.

Operations of the wireless device 300 (implemented using the structure of the block diagram of FIG. 3) will now be discussed with reference to the flow chart of FIG. 10 according to some embodiments of inventive concepts. For example, modules may be stored in memory 305 of FIG. 3, and these modules may provide instructions so that when the instructions of a module are executed by respective wireless device processing circuitry 303, processing circuitry 303 performs respective operations of the flow chart.

At block 1003, processing circuitry 303 may generate a plurality of service data units SDUs including first SDUs associated with a first SL hybrid automatic repeat request HARQ configuration, and second SDUs associated a second SL HARQ configuration different than the first HARQ configuration. At block 1007, processing circuitry 303 may multiplex the first SDUs into a first transport block TB so that the first TB includes the first SDUs associated with the first SL HARQ configuration without any of the second SDUs associated with the second SL HARQ configuration.

At block 1011, processing circuitry 303 may transmit the first TB (through transceiver 301) over a sidelink to at least one other wireless device using the first SL HARQ configuration. At block 1015, processing circuitry 303 may multiplex the second SDUs into a second transport block TB so that the second TB includes the second SDUs associated with the second SL HARQ configuration without any of the first SDUs associated with the first SL HARQ configuration. At block 1019, processing circuitry 303 may transmit the second TB (through transceiver 301) over a sidelink to at least one other wireless device using the second SL HARQ configuration.

Figure 10:
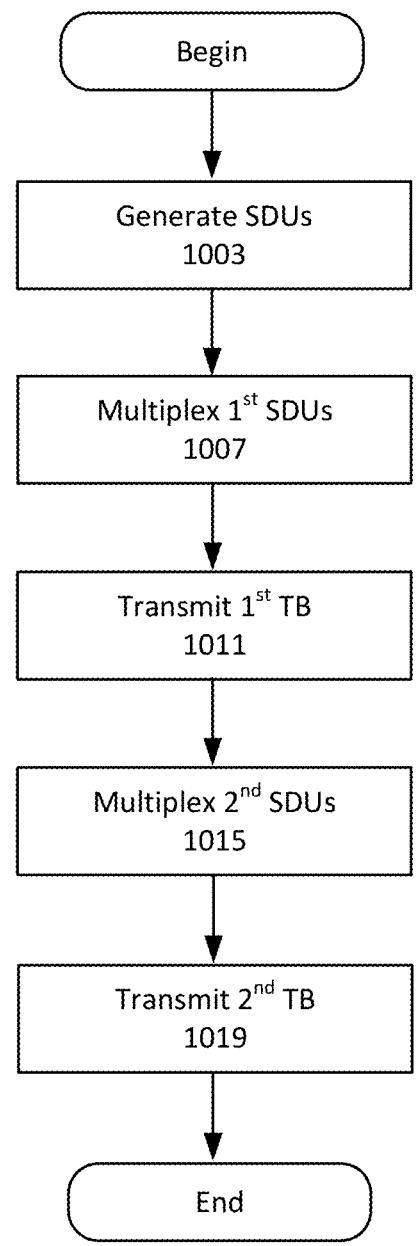
Figure 11:
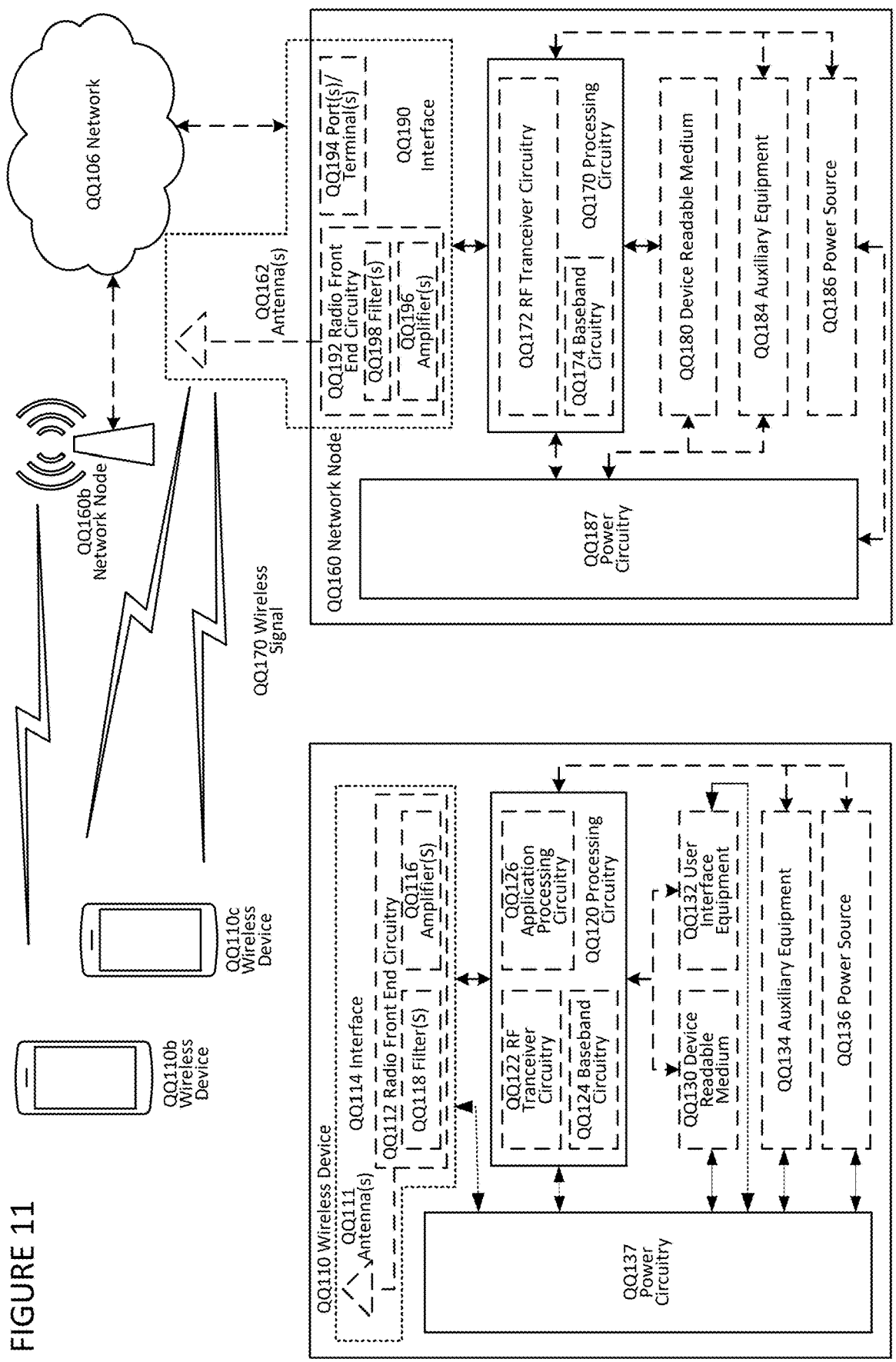
FIG. 11, also referred to herein as FIG. QQ1, is a block diagram of a wireless network in accordance with some embodiments.
Figure 12:
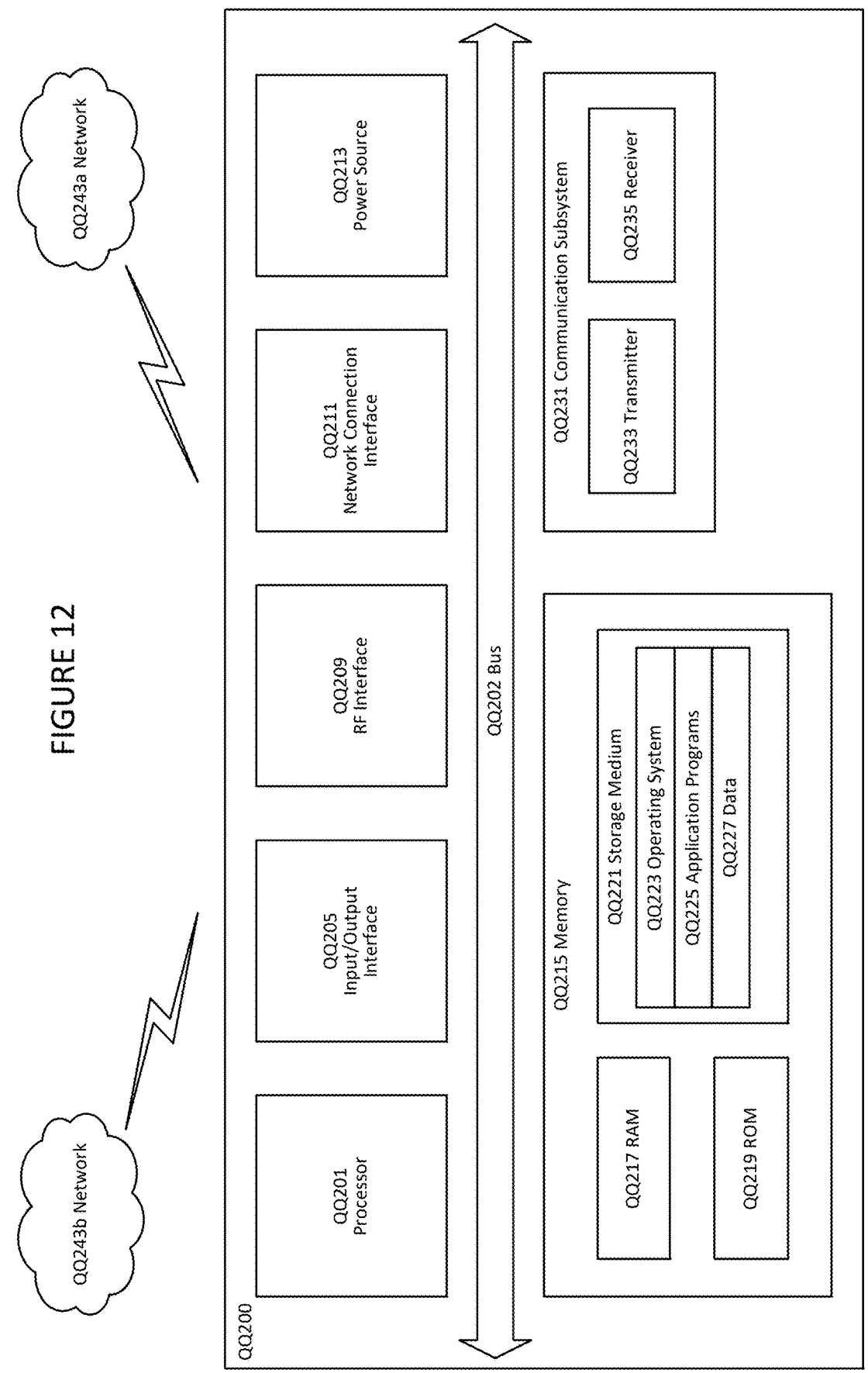
Figure 13:
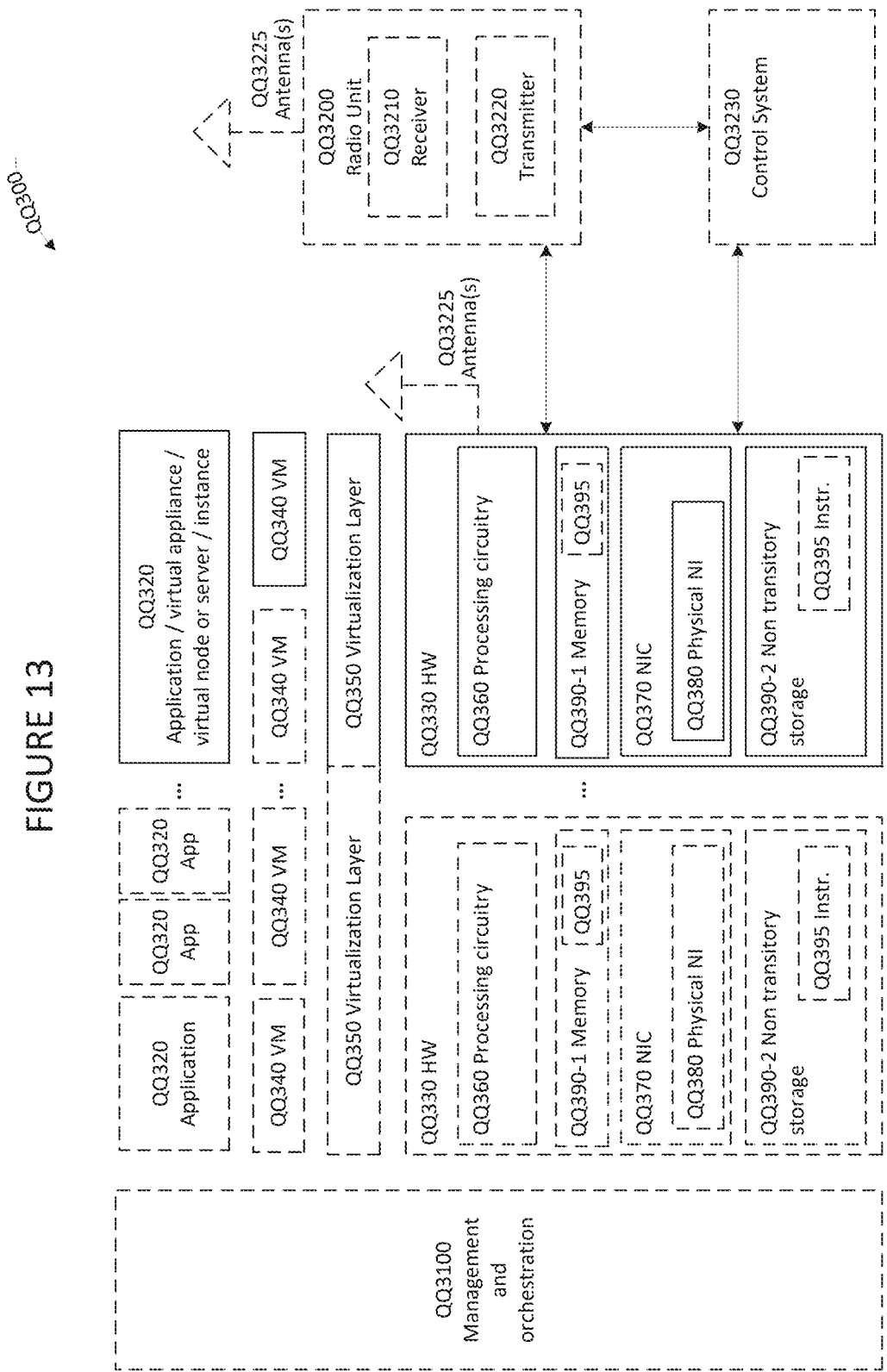
FIG. 13, also referred to herein as FIG. QQ2, is a block diagram of a user equipment in accordance with some embodiments FIG. 13, also referred to herein as FIG. QQ3, is a block diagram of a virtualization environment in accordance with some embodiments.
Figure 14:
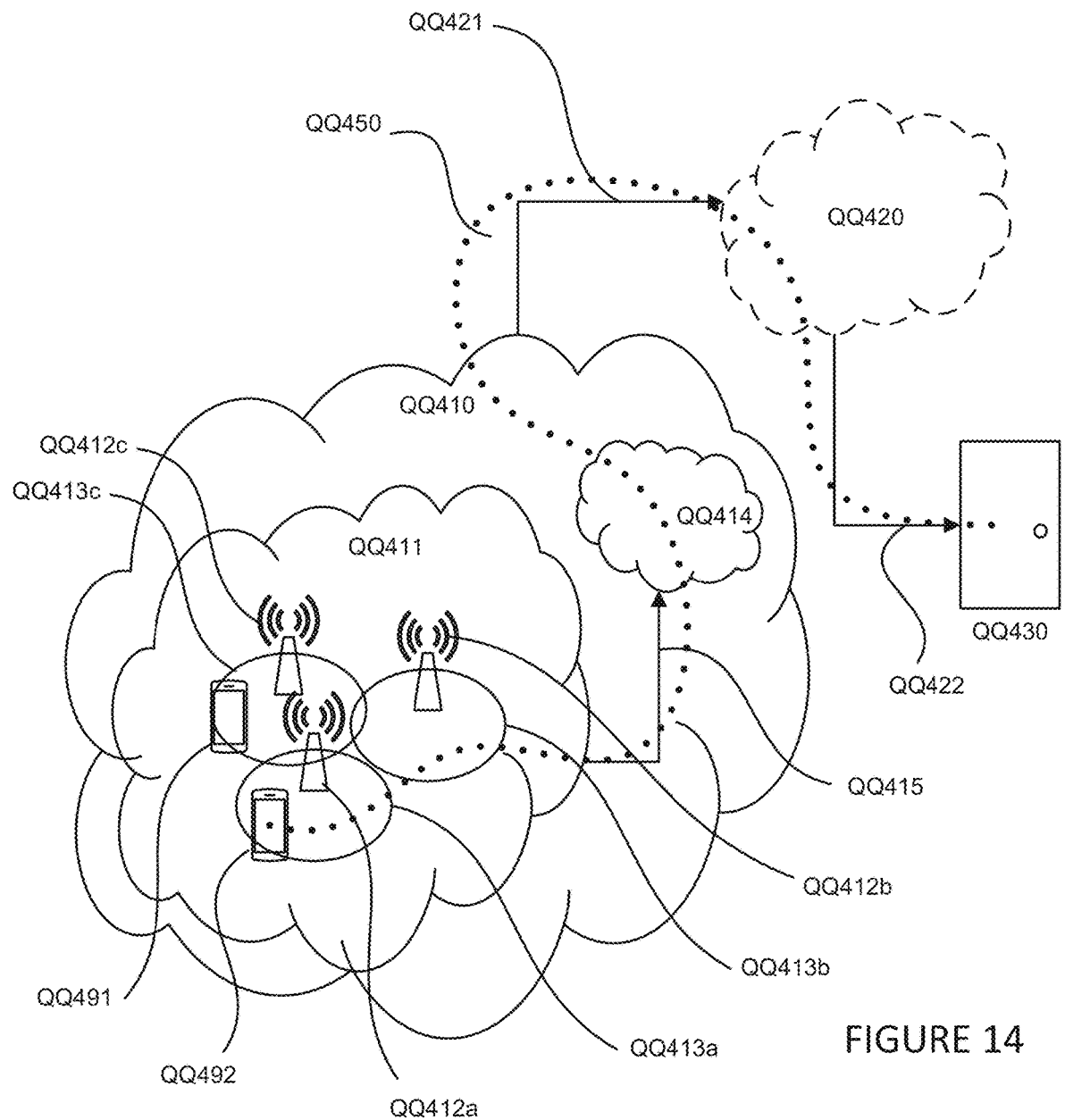
FIG. 14, also referred to herein as FIG. QQ4, is a block diagram of a telecommunication network connected via an intermediate network to a host computer in accordance with some embodiments.
Figure 15:
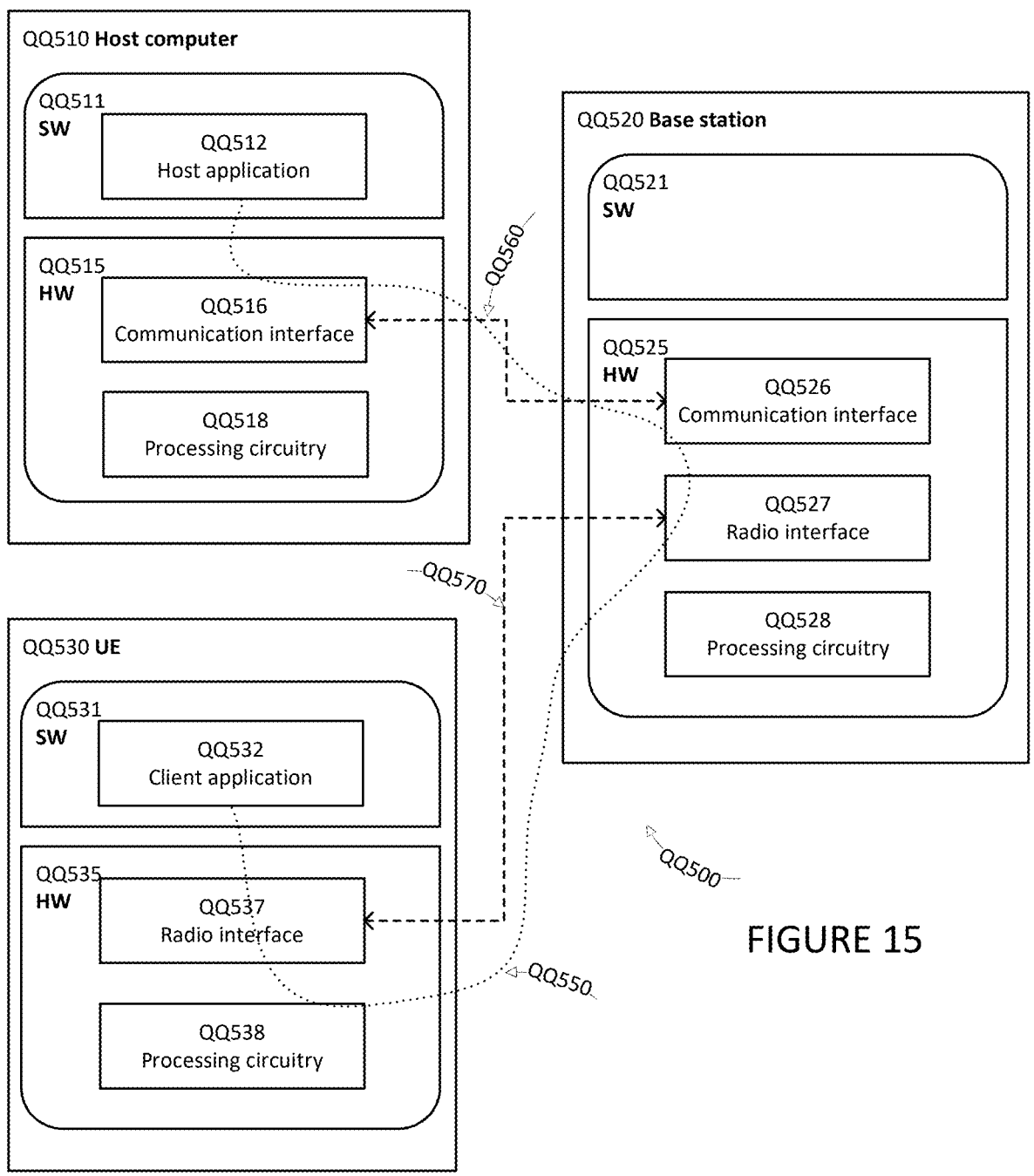
FIG. 15, also referred to herein as FIG. QQ5, is a block diagram of a host computer communicating via a base station with a user equipment over a partially wireless connection in accordance with some embodiments.
Figure 16:
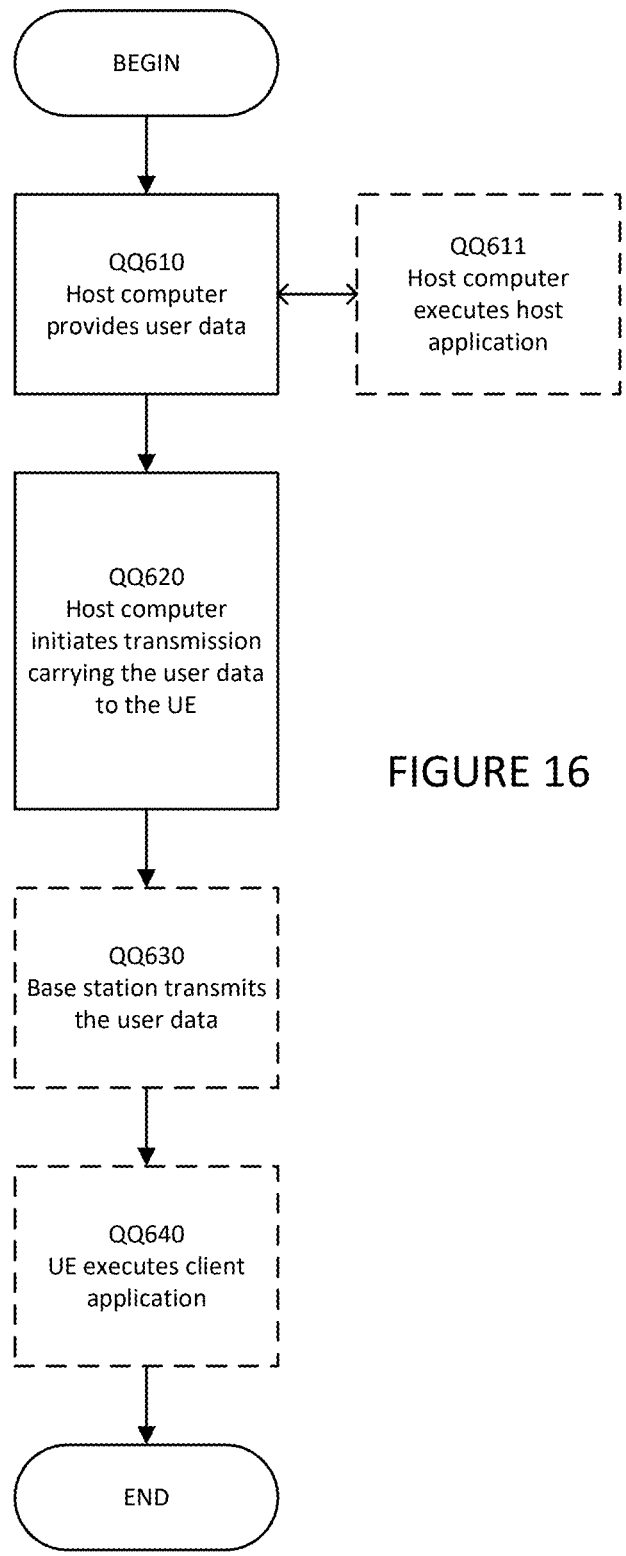
FIG. 16, also referred to herein as FIG. QQ6, is a block diagram of methods implemented in a communication system including a host computer, a base station and a user equipment in accordance with some embodiments.
Figure 17:
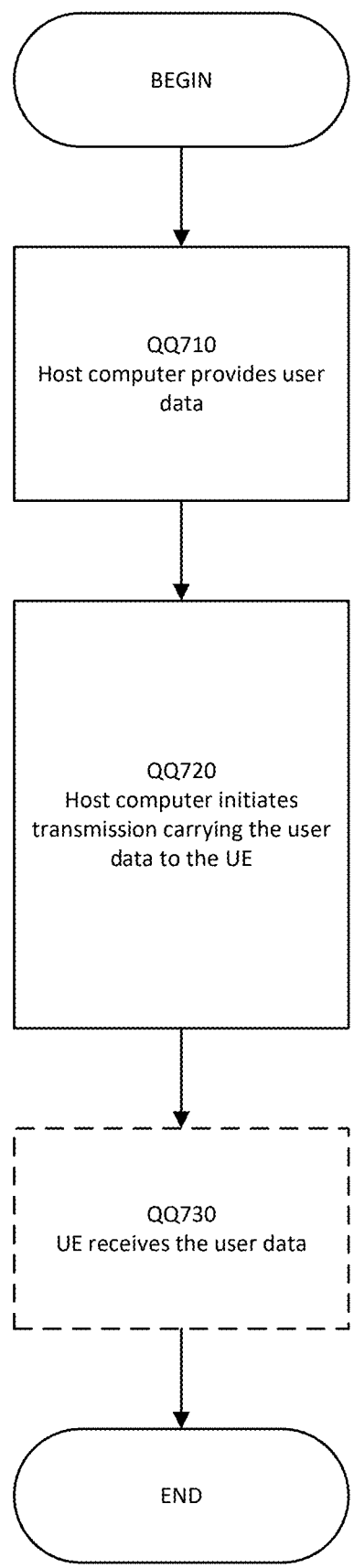
FIG. 17, also referred to herein as FIG. QQ7, is a block diagram of methods implemented in a communication system including a host computer, a base station and a user equipment in accordance with some embodiments.
Figure 18:
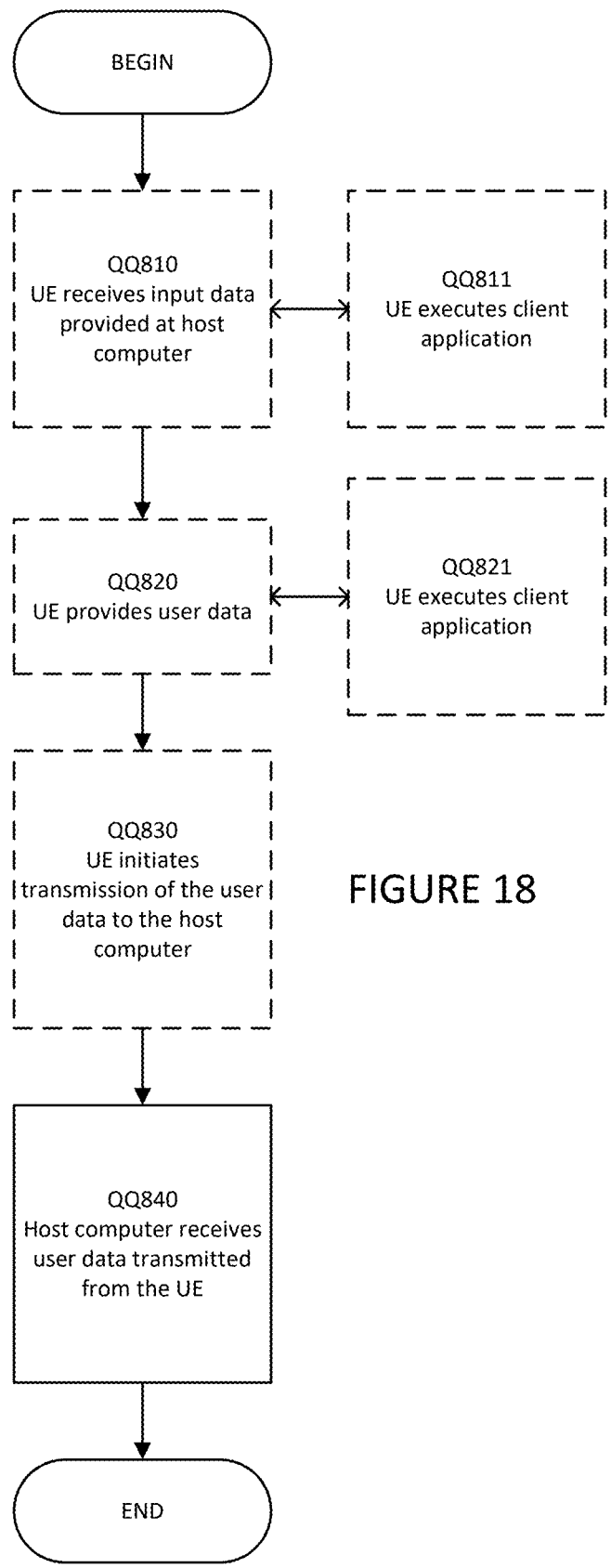
FIG. 18, also referred to herein as FIG. QQ8, is a block diagram of methods implemented in a communication system including a host computer, a base station and a user equipment in accordance with some embodiments.
Figure 19:
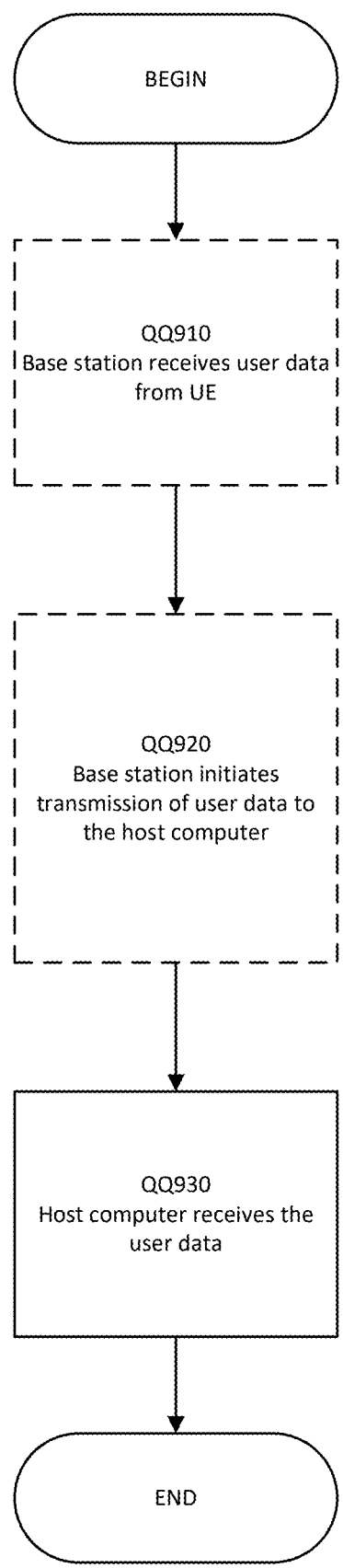
FIG. 19, also referred to herein as FIG. QQ9, is a block diagram of methods implemented in a communication system including a host computer, a base station and a user equipment in accordance with some embodiments.

Various operations from the flow chart of FIG. 10 may be optional with respect to some embodiments of wireless devices and related methods.

Example embodiments are discussed below.

1. A method of operating a wireless device providing sidelink, SL, communications, the method comprising:

generating (603) a plurality of service data units, SDUs, wherein each of the SDUs is associated with a respective service, wherein a first SDU of the plurality of SDUs is associated with a first service and a first sidelink, SL, hybrid automatic repeat request, HARQ, configuration, and wherein a second SDU of the plurality of SDUs is associated with a second service and a second SL HARQ configuration different that the first SL HARQ configuration;

multiplexing (607) the plurality of SDUs into a transport block, TB, (e.g., a protocol data unit, PDU, TB) so that the TB includes the first and second SDUs;

selecting (611) a SL HARQ configuration for the TB based on at least one of the first SL HARQ configuration associated with the first SDU and the second SL HARQ configuration associated with the second SDU; and transmitting (615) the TB over a sidelink to at least one other wireless device using the SL HARQ configuration selected for the TB.

2. The method of Embodiment 1, wherein the first SL HARQ configuration provides HARQ retransmission based on ACK/NACK feedback and the second SL HARQ configuration provides no HARQ retransmission, or wherein the first SL HARQ configuration provides HARQ retransmission without ACK/NACK feedback and the second SL HARQ configuration provides no HARQ retransmission, or wherein the first SL HARQ configuration provides HARQ retransmission based on ACK/NACK feedback and the second SL HARQ configuration provides HARQ retransmission without ACK/NACK feedback.

3. The method of Embodiment 2, wherein the SL HARQ configuration for the TB is selected based on a preference for one of the first and second SL HARQ configurations.

4. The method of Embodiment 3, wherein the first SL HARQ configuration provides HARQ retransmission based on ACK/NACK feedback and the second SL HARQ configuration provides no HARQ retransmission, and wherein the first SL HARQ configuration is selected for the TB based on a preference for HARQ retransmission based on ACK/NACK feedback relative to no HARQ retransmission.

5. The method of Embodiment 4, wherein the first SL HARQ configuration defines a maximum number of HARQ retransmissions based on ACK/NACK feedback and/or a time gap between a TB transmission (e.g., on a Physical Sidelink Shared Channel, PSSCH) and corresponding ACK/NACK feedback (e.g., on a Physical Sidelink Feedback Channel), and wherein the second SL HARQ configuration defines a number of HARQ retransmissions without ACK/NACK feedback.

6. The method of Embodiment 3, wherein the first SL HARQ configuration provides HARQ retransmission without ACK/NACK feedback and second SL HARQ configuration provides no HARQ retransmission, and wherein the first SL HARQ configuration is selected for the TB based on a preference for HARQ retransmission without ACK/NACK feedback relative to no HARQ retransmission.

7. The method of Embodiment 6, wherein the first SL HARQ configuration defines a number of HARQ retransmissions without ACK/NACK feedback.

8. The method of Embodiment 3, wherein the first SL HARQ configuration provides HARQ retransmission based on ACK/NACK feedback and the second SL HARQ configuration provides HARQ retransmission without ACK/NACK feedback, and wherein the first SL HARQ configuration is selected for the TB based on a preference for HARQ retransmission based on ACK/NACK feedback relative to HARQ retransmission without pACK/NACK feedback.

9. The method of Embodiment 8, wherein the first SL HARQ configuration defines a number of HARQ retransmissions without ACK/NACK feedback, and wherein the second SL HARQ configuration defines a maximum number of HARQ retransmissions based on ACK/NACK feedback and/or a time gap between a TB transmission (e.g., on a Physical Sidelink Shared Channel, PSSCH) and corresponding ACK/NACK feedback (e.g., on a Physical Sidelink Feedback Channel).

10. The method of any of Embodiments 1-2, wherein the first service has a first priority and the second service has a second priority different than the first priority, and wherein the SL HARQ configuration for the TB is selected based on the first and second priorities.

11. The method of Embodiment 10, wherein the first SL HARQ configuration is selected for the TB based on the first priority being greater than the second priority, or wherein the second SL HARQ configuration is selected for the TB based on the second priority being greater than the first priority.

12. The method of any of Embodiments 1-11, wherein the first service is associated with at least one of a first destination identity, a first source identify, a first logical channel identity, LCID, a first logical channel group, LCG, a first sidelink radio bearer identity, SLRB ID, a first Quality of Service identity, QFI, and/or a first 5th Generation Quality of Service identifier, 5QI, wherein the second service is associated with at least one of a second destination identity, a second source identity, a second LCID, a second LCG, a second SLRB ID, a second QFI, and/or a second 5QI, wherein the first SL HARQ configuration is associated with the at least one of the first destination identity, the first source identity, the first LCID, the first LCG, the first SLRB ID, the first QFI, and/or the first 5QI, and wherein the second SL HARQ configuration is associated with the at least one of the second destination identity, the second source identity, the second LCID, the second LCG, the second SLRB ID, the second QFI, and/or the second 5QI.

13. The method of Embodiment 1, wherein a third SDU of the plurality of SDUs is associated with a third service and a third SL HARQ configuration, wherein the TB includes the first, second, and third SDUs, and wherein the SL HARQ configuration for the TB is selected based on at least one of the first SL HARQ configuration associated with the first SDU, the second SL HARQ configuration associated with the second SDU, and the third SL HARQ configuration associated with the third SDU.

14. The method of Embodiment 13, wherein the first SL HARQ configuration provides HARQ retransmission based on ACK/NACK feedback, wherein the second SL HARQ configuration provides HARQ retransmission without ACK/NACK feedback, and wherein the second SL HARQ configuration provides no HARQ retransmission.

15. The method of Embodiment 14, wherein the first SL HARQ configuration defines a maximum number of HARQ retransmissions based on ACK/NACK feedback and/or a time gap between a TB transmission (e.g., on a Physical Sidelink Shared Channel, PSSCH) and corresponding ACK/

NACK feedback (e.g., on a Physical Sidelink Feedback Channel), and wherein the second SL HARQ configuration defines a number of HARQ retransmissions without ACK/NACK feedback.

16. The method of Embodiment 14, wherein the SL HARQ configuration for the TB is selected based on a preference for one of the first, second, and third SL HARQ configurations.

17. The method of Embodiment 16, wherein the first SL HARQ configuration is selected for the TB based on a preference for HARQ retransmission based on ACK/NACK feedback relative to HARQ retransmission without ACK/NACK feedback and relative to no HARQ retransmission.

18. The method of Embodiment 16, wherein the second SL HARQ configuration is selected for the TB based on a preference for HARQ retransmission without ACK/NACK feedback relative to HARQ retransmission based on ACK/NACK feedback and relative to no HARQ retransmission.

19. The method of Embodiment 16, wherein the third SL HARQ configuration is selected for the TB based on a preference for no HARQ retransmission relative to HARQ retransmission based on ACK/NACK feedback and relative to HARQ retransmission without ACK/NACK feedback.

20. The method of any of Embodiments 13-14, wherein the first service has a first priority, wherein the second service has a second priority different than the first priority, and wherein the third service has a third priority different than the first and second priorities, and wherein the SL HARQ configuration for the TB is selected based on the first, second, and third priorities.

21. The method of Embodiment 20, wherein the first SL HARQ configuration is selected for the TB based on the first priority being greater than the second and third priorities, or wherein the second SL HARQ configuration is selected for the TB based on the second priority being greater than the first and third priorities, or wherein the third SL HARQ configuration is selected for the TB based on the third priority being greater than the first and second priorities.

22. The method of any of Embodiments 13-21,
wherein the first service is associated with at least one of a first destination identity, a first source identity, a first logical channel identity, LCID, a first logical channel group, LCG, a first sidelink radio bearer identity, SLRB ID, a first Quality of Service identity, QFI, and/or a first 5th Generation Quality of Service identifier, 5QI,
wherein the second service is associated with at least one of a second destination identity, a second source identity, a second LCID, a second LCG, a second SLRB ID, a second QFI, and/or a second 5QI,
wherein the third service is associated with at least one of a third destination identity, a third source identity, a third LCID, a third LCG, a third SLRB ID, a third QFI, and/or a third 5 QI,
wherein the first SL HARQ configuration is associated with the at least one of the first destination identity, the first source identity, the first LCID, the first LCG, the first SLRB ID, the first QFI, and/or the first 5QI,
wherein the second SL HARQ configuration is associated with the at least one of the second destination identity, the second source identity, the second LCID, the second LCG, the second SLRB ID, the second QFI, and/or the second 5QI, and
wherein the third SL HARQ configuration is associated with the at least one of the third destination identity, the third source identity, the third LCID, the third LCG, the third SLRB ID, the third QFI, and/or the third 5QI.

23. The method of any of Embodiments 1-22 further comprising:
receiving (601) associations between the first service and the first SL HARQ configuration and between the second service and the second SL HARQ configuration from a radio access network.

24. The method of Embodiment 23, wherein the associations between the first service and the first SL HARQ configuration and between the second service and the second SL HARQ configuration are received via system information block, SIB, signaling and/or via radio resource control, RRC, signaling.

25. A method of operating a wireless device providing sidelink, SL, communications, the method comprising:
generating (703) a plurality of first service data units, SDUs, for a first service associated with a first sidelink hybrid automatic repeat request, SL HARQ, configuration and a first source/destination address;
generating (707) a plurality of second SDUs for a second service associated with a second SL HARQ configuration and a second source/destination address;
generating (711) a first transport block, TB, including the plurality of first SDUs and the first source/destination address;
transmitting (715) the first TB including the first plurality of SDUs and the first source/destination address over a sidelink using the first SL HARQ configuration based on the first source/destination address;
generating (719) a second transport block, TB, including the second plurality of SDUs and the second source/destination address; and
transmitting (723) the second TB including the second plurality of SDUs and the second source/destination address over the sidelink using the second SL HARQ configuration based on the second source/destination address.

26. The method of Embodiment 21, wherein the first SL HARQ configuration provides HARQ retransmission, and wherein the second SL HARQ configuration provides no HARQ retransmission, the method further comprising:
storing (717) the first TB in a HARQ buffer for retransmission based on the first source/destination address;
wherein transmitting the second TB comprises transmitting the second TB without storing the second TB in a HARQ buffer.

27. The method of Embodiment 26, wherein the first SL HARQ configuration provides HARQ retransmission based on ACK/NACK feedback, or wherein the first SL HARQ configuration provides HARQ retransmission without ACK/NACK feedback.

28. The method of any of Embodiments 25-27, wherein the first TB is transmitted using the first SL HARQ configuration based on the first source/destination address and based on a first HARQ process identifier for the first TB, and wherein the second TB is transmitted using the second SL HARQ configuration based on the second source/destination address and based on a second HARQ process identifier for the second TB.

29. A method of operating a wireless device providing sidelink, SL, communications, the method comprising:
receiving (803) a first transport block, TB, including a first plurality of SDUs and a first source/destination address over a sidelink;
identifying (807) a first SL hybrid automatic repeat request, HARQ, configuration associated with the first TB based on the first source/destination address;
processing (811) the first TB in accordance with the first SL HARQ configuration;

receiving (815) a second TB including a second plurality of SDUs and a second source/destination address over the sidelink;

identifying (819) a second SL HARQ configuration associated with the second TB based on the second source/destination address; and processing (823) the second TB in accordance with the second SL HARQ configuration.

30. The method of Embodiment 29, wherein the first SL HARQ configuration provides HARQ retransmission based on ACK/NACK feedback, or wherein the first SL HARQ configuration provides HARQ retransmission without ACK/NACK feedback.

31. The method of any of Embodiments 29-30, wherein the second SL HARQ configuration provides no HARQ retransmission.

32. The method of any of Embodiments 29-31, wherein the first SL HARQ configuration is identified based on the first source/destination address and based on a first HARQ process identifier for the first TB, and wherein the second SL HARQ configuration is identified based on the second source/destination address and based on a second HARQ process identifier for the second TB.

33. A method of operating a wireless device providing sidelink, SL, communications, the method comprising:

generating (903) a plurality of service data units, SDUs, wherein each of the SDUs is associated with a respective service;

multiplexing (907) the plurality of SDUs into a transport block, TB (e.g., a protocol data unit, PDU, TB), so that the TB includes the plurality of SDUs;

selecting (911) a SL HARQ configuration for the TB based on at least one of a first SL HARQ configuration associated with a first SL radio bearer configured for the wireless device and a second SL HARQ configuration associated a second SL radio bearer configured for the wireless device; and transmitting (915) the TB over a sidelink to at least one other wireless device using the SL HARQ configuration selected for the TB.

34. The method of Embodiment 33, wherein a first SDU of the plurality of SDUs is associated with the first SL radio bearer and a second SDU of the plurality of SDUs is associated with the second SL radio bearer.

35. The method of Embodiments 33, wherein each of the plurality of SDUs is associated with a respective SL radio bearer that is configured for the wireless device, and wherein none of the plurality of SDUs is associated with the first SL radio bearer and/or the second SL radio bearer.

36. A method of operating a wireless device providing sidelink, SL, communications, the method comprising:

generating (1003) a plurality of service data units, SDUs, including first SDUs associated with a first SL hybrid automatic repeat request, HARQ, configuration, and second SDUs associated a second SL HARQ configuration different than the first HARQ configuration;

multiplexing (1007) the first SDUs into a first transport block, TB, so that the first TB includes the first SDUs associated with the first SL HARQ configuration without any of the second SDUs associated with the second SL HARQ configuration;

transmitting (1011) the first TB over a sidelink to at least one other wireless device using the first SL HARQ configuration;

multiplexing (1015) the second SDUs into a second transport block, TB, so that the second TB includes the second SDUs associated with the second SL HARQ configuration without any of the first SDUs associated with the first SL HARQ configuration; and transmitting (1019) the second TB over a sidelink to at least one other wireless device using the second SL HARQ configuration.

37. The method of Embodiment 36, wherein generating the plurality of SDUs comprises generating at least one of the first SDUs interleaved in time between at least two of the second SDUs, and/or wherein generating the plurality of SDUs comprises generating at least one of the second SDUs interleaved in time between at least two of the first SDUs.

38. The method of any of Embodiments 36-37, wherein at least two of the first SDUs are associated with different SL radio bearers having the first SL HARQ configuration and/or different logical channels having the first SL HARQ configuration, and/or wherein at least two of the second SDUs are associated with different SL radio bearers having the second SL HARQ configuration and/or different logical channels having the second HARQ configuration.

39. A wireless device (300) configured to operate in a communication network, the wireless device comprising:

processing circuitry (303); and memory (305) coupled with the processing circuitry, wherein the memory includes instructions that when executed by the processing circuitry causes the wireless device to perform operations according to any of Embodiments 1-38.

40. A wireless device (300) configured to operate in a communication network, wherein the wireless device is adapted to perform according to any of Embodiments 1-38.

41. A computer program comprising program code to be executed by processing circuitry (303) of a wireless device (300), whereby execution of the program code causes the wireless device (300) to perform operations according to any of embodiments 1-38.

42. A computer program product comprising a non-transitory storage medium including program code to be executed by processing circuitry (303) of a wireless device (300), whereby execution of the program code causes the wireless device (300) to perform operations according to any of embodiments 1-38.

Explanations are provided below for various abbreviations/acronyms used in the present disclosure.

Abbreviation Explanation
NW Network
UE User Equipment
V2X Vehicle-to-Everything
MAC Medium Access Control
MAC CE MAC Control Element
PUSCH Physical Uplink Shared Channel
PUCCH Physical Uplink Control Channel
PDU Packet Data Unit
3GPP Third Generation Partnership Project
LCID Logical Channel Identity
MAC Medium Access Control
MAC CE Medium Access Control-Control Element
RRC Radio Resource Control
IP Internet Protocol
PPPP ProSe Per Packet Priority
PPPR ProSe Per Packet Reliability
ProSe Proximity Services
PRB Physical Resource Block
SL Sidelink
UL Uplink
DL Downlink
LCG Logical Channel Group
AMF Access Management Function SMF Session Management Function
 DRB Data Radio Bearer
 PDU Protocol data unit
 QoS Quality of service
LCP Logical Channel Prioritization
 SDU Service Data Unit
TB Transport Block
 AS Access stratum
SCI Sidelink Control Information
 Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

FIG. QQ1 1 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. QQ1. For simplicity, the wireless network of FIG. QQ1 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. QQ1, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. QQ11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. QQ1 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

FIG. QQ2 illustrates a user Equipment in accordance with some embodiments.

FIG. QQ2 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. QQ2, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. QQ2 is a UE, the components discussed herein are equally applicable to a WD, and vice-versa.

In FIG. QQ2, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. QQ2, or only a subset of the components. The level of integration between the components may vary from one UE to another UE. Further, certain UEs may contain multiple instances of a component, such as multiple processors, memories, transceivers, transmitters, receivers, etc.

In FIG. QQ2, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. QQ2, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. QQ2, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

FIG. QQ3 illustrates a virtualization environment in accordance with some embodiments.

FIG. QQ3 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. QQ3, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. QQ3.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

FIG. QQ4 illustrates a telecommunication network connected via an intermediate network to a host computer in accordance with some embodiments.

With reference to FIGURE QQ4, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. QQ4 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

FIG. QQ5 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. QQ5. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. QQ5) served by base station QQ520. Communication interface QQ526 may be configured to facilitate connection QQ560 to host computer QQ510. Connection QQ560 may be direct or it may pass through a core network (not shown in FIG. QQ5) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. QQ5 may be similar or identical to host computer QQ430, one of base stations QQ412a, QQ412b, QQ412c and one of UEs QQ491, QQ492 of FIG. QQ4, respectively. This is to say, the inner workings of these entities may be as shown in FIG. QQ5 and independently, the surrounding network topology may be that of FIG. QQ4.

In FIG. QQ5, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

FIG. QQ6 illustrates methods implemented in a communication system including a host computer, a base station and a user equipment in accordance with some embodiments FIG. QQ6 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to Figure QQ6 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. QQ7 illustrates methods implemented in a communication system including a host computer, a base station and a user equipment in accordance with some embodiments.

FIG. QQ7 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to Figure QQ7 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

FIG. QQ8 illustrates methods implemented in a communication system including a host computer, a base station and a user equipment in accordance with some embodiments FIG. QQ8 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to Figure QQ8 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. QQ9 illustrates methods implemented in a communication system including a host computer, a base station and a user equipment in accordance with some embodiments FIG. QQ9 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to Figure QQ9 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a wireless device providing sidelink (SL) communications, the method comprising:
generating a plurality of service data units (SDUs) including first SDUs associated with a first SL hybrid automatic repeat request (HARQ) configuration, and second SDUs associated with a second SL HARQ configuration different than the first SL HARQ configuration, wherein the first SL HARQ configuration provides HARQ retransmission, and wherein the second SL HARQ configuration provides no HARQ retransmission;
multiplexing the first SDUs into a first transport block (TB) so that the first TB includes the first SDUs associated with the first SL HARQ configuration without any of the second SDUs associated with the second SL HARQ configuration;
transmitting the first TB over a sidelink from the wireless device to at least one other wireless device using the first SL HARQ configuration and storing the first TB in a HARQ buffer for potential retransmission based on the first SL HARQ configuration;
multiplexing the second SDUs into a second TB so that the second TB includes the second SDUs associated with the second SL HARQ configuration without any of the first SDUs associated with the first SL HARQ configuration; and
transmitting the second TB over a sidelink from the wireless device to the at least one other wireless device using the second SL HARQ configuration without storing the second TB in the HARQ buffer.

2. The method of claim 1, wherein generating the plurality of SDUs comprises generating at least one of the first SDUs interleaved in time between at least two of the second SDUs, and/or wherein generating the plurality of SDUs comprises generating at least one of the second SDUs interleaved in time between at least two of the first SDUs.

3. The method of claim 1, wherein at least two of the first SDUs are associated with different SL radio bearers having the first SL HARQ configuration and/or different logical channels having the first SL HARQ configuration, and/or wherein at least two of the second SDUs are associated with different SL radio bearers having the second SL HARQ configuration and/or different logical channels having the second SL HARQ configuration.

4. A method of operating a wireless device providing sidelink (SL) communications, the method comprising:
generating a plurality of service data units (SDUs) including a first SDU associated with a first SL radio bearer configured for the wireless device and a second SDU associated with a second SL radio bearer configured for the wireless device, wherein each of the SDUs is associated with a respective service;
multiplexing the plurality of SDUs into a transport block (TB) so that the TB includes the plurality of SDUs;
selecting an SL HARQ configuration for the TB based on at least one of a first SL HARQ configuration associated with the first SL radio bearer configured for the wireless device and a second SL HARQ configuration associated with the second SL radio bearer configured for the wireless device, wherein the second SL HARQ configuration is different than the first SL HARQ configuration, wherein selecting the SL HARQ configuration for the TB includes inheriting the SL HARQ configuration associated with the SL radio bearer with the highest priority among the first SL radio bearer and the second SL radio bearer, such that the inherited configuration governs HARQ retransmissions for the TB irrespective of whether that configuration enables or disables retransmissions; and
transmitting the TB over a sidelink to at least one other wireless device using the SL HARQ configuration selected for the TB.

5. The method of claim 4, wherein the first SL radio bearer has a higher priority than the second SL radio bearer, the first SL HARQ configuration indicates that HARQ retransmissions are disabled, and the second SL HARQ configuration indicates that HARQ retransmissions are enabled, and wherein selecting the SL HARQ configuration for the TB comprises selecting the first SL HARQ configuration such that HARQ retransmissions are disabled for the TB.

6. The method of claim 4, wherein a first service has a first priority and a second service has a second priority different than the first priority, and wherein the SL HARQ configuration for the TB is selected based on the first and second priorities.

7. The method of claim 6,
wherein the first service is associated with at least one of a first destination identity, a first source identity, a first logical channel identity (LCID), a first logical channel group (LCG), a first sidelink radio bearer identity (SLRB ID), a first Quality of Service identity (QFI), and/or a first 5th Generation Quality of Service identifier (5QI), wherein the second service is associated with at least one of a second destination identity, a second source identity, a second LCID, a second LCG, a second SLRB ID, a second QFI, and/or a second 5QI, wherein the first SL HARQ configuration is associated with the at least one of the first destination identity, the first source identity, the first LCID, the first LCG, the first SLRB ID, the first QFI, and/or the first 5QI, and wherein the second SL HARQ configuration is associated with the at least one of the second destination identity, the second source identity, the second LCID, the second LCG, the second SLRB ID, the second QFI, and/or the second 5QI.

8. The method of claim 6, further comprising:

receiving associations between the first service and the first SL HARQ configuration and between the second service and the second SL HARQ configuration from a radio access network.

9. The method of claim 8, wherein the associations between the first service and the first SL HARQ configuration and between the second service and the second SL HARQ configuration are received via system information block (SIB) signaling and/or via radio resource control (RRC) signaling.

10. A wireless device configured to operate in a communication network, the wireless device comprising:
processing circuitry; and
memory coupled with the processing circuitry, wherein the memory includes instructions that, when executed by the processing circuitry, cause the wireless device to:
generate a plurality of service data units (SDUs) including first SDUs associated with a first SL hybrid automatic repeat request (HARQ) configuration, and second SDUs associated with a second SL HARQ configuration different than the first SL HARQ configuration, wherein the first SL HARQ configuration provides HARQ retransmission, and wherein the second SL HARQ configuration provides no HARQ retransmission;
multiplex the first SDUs into a first transport block (TB) so that the first TB includes the first SDUs associated with the first SL HARQ configuration without any of the second SDUs associated with the second SL HARQ configuration;
transmit the first TB over a sidelink from the wireless device to at least one other wireless device using the first SL HARQ configuration and storing the first TB in a HARQ buffer for potential retransmission based on the first SL HARQ configuration;
multiplex the second SDUs into a second TB so that the second TB includes the second SDUs associated with the second SL HARQ configuration without any of the first SDUs associated with the first SL HARQ configuration; and
transmit the second TB over a sidelink from the wireless device to the at least one other wireless device using the second SL HARQ configuration without storing the second TB in the HARQ buffer.

11. The wireless device of claim 10, wherein the instructions, when executed by the processing circuitry, cause the wireless device to generate the plurality of SDUs such that at least one of the first SDUs is interleaved in time between two of the second SDUs, and/or at least one of the second SDUs interleaved in time between two of the first SDUs.

12. The wireless device of claim 10, wherein at least two of the first SDUs are associated with different SL radio bearers having the first SL HARQ configuration and/or different logical channels having the first SL HARQ configuration, and/or wherein at least two of the second SDUs are associated with different SL radio bearers having the second SL HARQ configuration and/or different logical channels having the second SL HARQ configuration.

13. A wireless device configured to operate in a communication network, the wireless device comprising:
processing circuitry; and
memory coupled with the processing circuitry, wherein the memory includes instructions that, when executed by the processing circuitry, cause the wireless device to:
generate a plurality of service data units (SDUs) including a first SDU associated with a first SL radio bearer configured for the wireless device and a second SDU associated with a second SL radio bearer configured for the wireless device, wherein each of the SDUs is associated with a respective service;
multiplex the plurality of SDUs into a transport block (TB) so that the TB includes the plurality of SDUs;
select an SL HARQ configuration for the TB based on at least one of a first SL HARQ configuration associated with the first SL radio bearer configured for the wireless device and a second SL HARQ configuration associated with the second SL radio bearer configured for the wireless device, wherein the second SL HARQ configuration is different than the first SL HARQ configuration, wherein selecting the SL HARQ configuration for the TB includes inheriting the SL HARQ configuration associated with the SL radio bearer with the highest priority among the first SL radio bearer and the second SL radio bearer, such that the inherited configuration governs HARQ retransmissions for the TB irrespective of whether that configuration enables or disables retransmissions; and
transmit the TB over a sidelink to at least one other wireless device using the SL HARQ configuration selected for the TB.

14. The wireless device of claim 13, wherein the first SL radio bearer has a higher priority than the second SL radio bearer, the first SL HARQ configuration indicates that HARQ retransmissions are disabled, and the second SL HARQ configuration indicates that HARQ retransmissions are enabled, and wherein selecting the SL HARQ configuration for the TB comprises selecting the first SL HARQ configuration such that HARQ retransmissions are disabled for the TB.

15. The wireless device of claim 13, wherein a first service has a first priority and a second service has a second priority different than the first priority, and wherein the SL HARQ configuration for the TB is selected based on the first and second priorities.

16. The wireless device of claim 15,
wherein the first service is associated with at least one of a first destination identity, a first source identity, a first logical channel identity (LCID) a first logical channel group (LCG) a first sidelink radio bearer identity (SLRB ID) a first Quality of Service identity (QFI) and/or a first 5th Generation Quality of Service identifier (5QI), wherein the second service is associated with at least one of a second destination identity, a second source identity, a second LCID, a second LCG, a second SLRB ID, a second QFI, and/or a second 5QI, wherein the first SL HARQ configuration is associated with the at least one of the first destination identity, the first source identity, the first LCID, the first LCG, the first SLRB ID, the first QFI, and/or the first 5QI, and wherein the second SL HARQ configuration is associated with the at least one of the second destination identity, the second source identity, the second LCID, the second LCG, the second SLRB ID, the second QFI, and/or the second 5QI.

17. The wireless device of claim 15, wherein the instructions, when executed by the processing circuitry, cause the wireless device to:

receive associations between the first service and the first SL HARQ configuration and between the second service and the second SL HARQ configuration from a radio access network.

18. The wireless device of claim 17, wherein the instructions, when executed by the processing circuitry, cause the wireless device to:

receive the associations between the first service and the first SL HARQ configuration and between the second service and the second SL HARQ configuration via system information block (SIB) signaling and/or via radio resource control (RRC) signaling.

\* \* \* \* \*